US011690103B2

(12) United States Patent
Zhang et al.

(10) Patent No.: US 11,690,103 B2
(45) Date of Patent: Jun. 27, 2023

(54) TECHNIQUES FOR SELECTING A RANDOM ACCESS CHANNEL OCCASION

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Franklin Park, NJ (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 134 days.

(21) Appl. No.: 17/209,817

(22) Filed: Mar. 23, 2021

(65) Prior Publication Data

US 2022/0312486 A1 Sep. 29, 2022

(51) Int. Cl.
*H04W 72/00* (2023.01)
*H04B 17/318* (2015.01)
(Continued)

(52) U.S. Cl.
CPC .............................. *H04W 74/0833* (2013.01)

(58) Field of Classification Search
CPC ........... H04W 74/0833; H04W 74/002; H04W 74/0866; H04W 28/06; H04W 74/006;
(Continued)

(56) References Cited

U.S. PATENT DOCUMENTS

| 8,380,216 B2* | 2/2013 | Park ................... H04W 74/002 455/452.2 |
| 2009/0011769 A1* | 1/2009 | Park ................. H04W 74/0866 455/452.2 |

(Continued)

FOREIGN PATENT DOCUMENTS

| CN | 112040558 A | 12/2020 |
| EP | 3780871 A1 | 2/2021 |

(Continued)

OTHER PUBLICATIONS

International Search Report and Written Opinion—PCT/US2022/016665—ISA/EPO—dated May 11, 2022.

*Primary Examiner* — Edan Orgad
*Assistant Examiner* — Vanneilian Lalchinthang
(74) *Attorney, Agent, or Firm* — Holland & Hart LLP

(57) ABSTRACT

Methods, systems, and devices for wireless communications are described. A user equipment (UE) may select a random access channel (RACH) occasion (RO) based on one or more channel quality thresholds, such as reference signal received power (RSRP) thresholds. A base station may determine a set of RO types for receiving RACH transmissions. The base station may determine a channel quality threshold for each RO type. The base station may broadcast a configuration indicating the RO types and the associated channel quality thresholds. The UE may receive the configuration and measure a channel quality between the UE and the base station. Based on the measured channel quality, the UE may determine which RO types are available based (Continued)

on the indicated channel quality thresholds, and select an RO for transmitting a RACH preamble to establish a connection with the base station based on the available RO types.

30 Claims, 19 Drawing Sheets

(51) Int. Cl.
    *H04L 5/00*     (2006.01)
    *H04W 74/08*     (2009.01)

(58) Field of Classification Search
    CPC ..... H04W 28/18; H04W 48/16; H04W 72/02; H04W 72/042; H04W 88/085; H04B 17/318; H04L 5/0051
    USPC .......................................................... 370/329
    See application file for complete search history.

(56) References Cited

U.S. PATENT DOCUMENTS

| | | | |
|---|---|---|---|
| 2010/0165943 A1* | 7/2010 | Kato | H04W 74/0833 |
| | | | 370/329 |
| 2018/0248675 A1* | 8/2018 | Bhattad | H04L 25/0226 |
| 2018/0376428 A1* | 12/2018 | Lin | H04W 52/146 |
| 2019/0268946 A1* | 8/2019 | Harada | H04W 74/02 |
| 2020/0204312 A1* | 6/2020 | Xu | H04L 5/001 |
| 2020/0350972 A1* | 11/2020 | Yi | H04W 76/19 |
| 2020/0351066 A1* | 11/2020 | Cirik | H04L 5/0098 |
| 2021/0051672 A1* | 2/2021 | Rastegardoost | H04W 72/0493 |
| 2021/0051707 A1* | 2/2021 | Rastegardoost | H04B 17/318 |
| 2021/0051736 A1* | 2/2021 | Jeon | H04W 76/18 |

FOREIGN PATENT DOCUMENTS

| | | |
|---|---|---|
| WO | WO-2007078165 A1 | 7/2007 |
| WO | WO-2022071755 A1 | 4/2022 |

\* cited by examiner

TECHNIQUES FOR SELECTING A RANDOM ACCESS CHANNEL OCCASION

FIELD OF TECHNOLOGY

The following relates to wireless communications, including techniques for selecting a random access channel occasion.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, wireless devices may communicate in full-duplex (FD) communications, in which a device may transmit transmissions using a first antenna panel while concurrently receiving transmissions using a second antenna panel. Conventional techniques for FD communications, however, may be deficient.

SUMMARY

The described techniques relate to improved methods, systems, devices, and apparatuses that support techniques for selecting a random access channel occasion. Generally, the described techniques provide for selecting a random access channel (RACH) occasion (RO) based on one or more channel quality thresholds, such as reference signal received power (RSRP) thresholds. A base station may determine a set of RO types for receiving RACH transmissions. The RO types may include a time division multiplexing (TDM) RO type, a frequency division multiplexing (FDM) RO type, a spatial division multiplexing (SDM) RO type, etc. The base station may determine a channel quality threshold for each RO type. For example, a channel quality threshold for a TDM RO type may be less than a channel quality threshold for an FDM RO type, and the channel quality threshold for an FDM RO type may be less than a channel quality threshold for an SDM RO type. The base station may broadcast a configuration indicating the RO types and the associated channel quality thresholds. A user equipment (UE) may receive the configuration and measure a channel quality between the UE and the base station. Based on the measured channel quality, the UE may determine which RO types are available based on the indicated channel quality thresholds, and select an RO for transmitting a RACH preamble to establish a connection with the base station based on the available RO types. In some examples, one or more RO types (e.g., an FDM RO type, an SDM RO type, among other examples) may include full-duplex (FD) communication techniques. The configuration indicating the RO types and associated channel quality thresholds may enable increased system efficiency and reduced latency at the UE, among other benefits.

A method for wireless communications at a UE is described. The method may include receiving, from a base station, control signaling identifying a configuration that indicates a set of multiple random access channel occasion types and a channel quality threshold for each random access channel occasion type of the set of multiple random access channel occasion types, selecting, based on the configuration and a channel quality between the UE and the base station, a random access channel occasion type of the set of multiple random access channel occasion types and a random access channel occasion associated with the selected random access channel occasion type, and transmitting a random access channel preamble in the selected random access channel occasion according to the selected random access channel occasion type.

An apparatus for wireless communications at a UE is described. The apparatus may include a processor, memory coupled with the processor, and instructions stored in the memory. The instructions may be executable by the processor to cause the apparatus to receive, from a base station, control signaling identifying a configuration that indicates a set of multiple random access channel occasion types and a channel quality threshold for each random access channel occasion type of the set of multiple random access channel occasion types, select, based on the configuration and a channel quality between the UE and the base station, a random access channel occasion type of the set of multiple random access channel occasion types and a random access channel occasion associated with the selected random access channel occasion type, and transmit a random access channel preamble in the selected random access channel occasion according to the selected random access channel occasion type.

Another apparatus for wireless communications at a UE is described. The apparatus may include means for receiving, from a base station, control signaling identifying a configuration that indicates a set of multiple random access channel occasion types and a channel quality threshold for each random access channel occasion type of the set of multiple random access channel occasion types, means for selecting, based on the configuration and a channel quality between the UE and the base station, a random access channel occasion type of the set of multiple random access channel occasion types and a random access channel occasion associated with the selected random access channel occasion type, and means for transmitting a random access channel preamble in the selected random access channel occasion according to the selected random access channel occasion type.

A non-transitory computer-readable medium storing code for wireless communications at a UE is described. The code may include instructions executable by a processor to receive, from a base station, control signaling identifying a configuration that indicates a set of multiple random access channel occasion types and a channel quality threshold for each random access channel occasion type of the set of multiple random access channel occasion types, select, based on the configuration and a channel quality between the UE and the base station, a random access channel occasion type of the set of multiple random access channel occasion types and a random access channel occasion associated with the selected random access channel occasion type, and transmit a random access channel preamble in the selected random access channel occasion according to the selected random access channel occasion type.

In some examples of the method, apparatuses, and non-transitory computer-readable medium described herein, the configuration further indicates one or more transmission configurations for one or more of the set of multiple random access channel occasion types and the one or more transmission configurations may be associated with a subset of channel quality thresholds.

Some examples of the method, apparatuses, and non-transitory computer-readable medium described herein may further include operations, features, means, or instructions for selecting a transmission configuration associated with the selected random access channel occasion type based on the configuration and the subset of channel quality thresholds.

In some examples of the method, apparatuses, and non-transitory computer-readable medium described herein, the configuration further indicates one or more beam pairs for one or more random access channel occasions, the one or more random access channel occasions including the selected random access channel occasion and the one or more beam pairs may be associated with a subset of channel quality thresholds.

Some examples of the method, apparatuses, and non-transitory computer-readable medium described herein may further include operations, features, means, or instructions for selecting a beam pair associated with the selected random access channel occasion based on the configuration and the subset of channel quality thresholds.

In some examples of the method, apparatuses, and non-transitory computer-readable medium described herein, the selected random access channel occasion may be non-overlapping in a time domain with time resources of a downlink transmission.

In some examples of the method, apparatuses, and non-transitory computer-readable medium described herein, the selected random access channel occasion may be overlapping in a time domain with time resources of a downlink transmission and non-overlapping in a frequency domain with frequency resources of the downlink transmission.

In some examples of the method, apparatuses, and non-transitory computer-readable medium described herein, the selected random access channel occasion may be separated, in a frequency domain, from frequency resources of the downlink transmission by a guard band.

In some examples of the method, apparatuses, and non-transitory computer-readable medium described herein, the configuration further indicates a characteristic of the guard band based on the channel quality and the one or more channel quality thresholds.

In some examples of the method, apparatuses, and non-transitory computer-readable medium described herein, the selected random access channel occasion may be overlapping in a time domain with time resources of a downlink transmission, overlapping in a frequency domain with frequency resources of the downlink transmission, and non-overlapping in a spatial domain with spatial resources of the downlink transmission.

Some examples of the method, apparatuses, and non-transitory computer-readable medium described herein may further include operations, features, means, or instructions for receiving second control signaling identifying an updated configuration, where selecting the random access channel occasion type and the random access channel occasion may be based on the updated configuration, and where the one or more channel quality thresholds may be determined based on the channel quality.

In some examples of the method, apparatuses, and non-transitory computer-readable medium described herein, the one or more channel quality thresholds may be indicated by one or more radio resource control parameters in the received control signaling.

In some examples of the method, apparatuses, and non-transitory computer-readable medium described herein, selecting the random access channel occasion type may include operations, features, means, or instructions for comparing the channel quality with the channel quality threshold for each random access channel occasion type.

In some examples of the method, apparatuses, and non-transitory computer-readable medium described herein, the set of multiple random access channel occasion types include a time division multiplexing type, a frequency division multiplexing type, a spatial division multiplexing type, or a combination thereof.

In some examples of the method, apparatuses, and non-transitory computer-readable medium described herein, each channel quality threshold includes a synchronization signal block threshold or a channel state information reference signal threshold, or both.

A method for wireless communications at a base station is described. The method may include determining a set of multiple random access channel occasion types and a channel quality threshold for each random access channel occasion type of the set of multiple random access channel occasion types, transmitting, to a UE, control signaling identifying a configuration that indicates the set of multiple random access channel occasion types and the channel quality threshold for each random access channel occasion type of the set of multiple random access channel occasion types, and receiving a random access channel preamble in a random access channel occasion associated with a random access channel occasion type.

An apparatus for wireless communications at a base station is described. The apparatus may include a processor, memory coupled with the processor, and instructions stored in the memory. The instructions may be executable by the processor to cause the apparatus to determine a set of multiple random access channel occasion types and a channel quality threshold for each random access channel occasion type of the set of multiple random access channel occasion types, transmit, to a UE, control signaling identifying a configuration that indicates the set of multiple random access channel occasion types and the channel quality threshold for each random access channel occasion type of the set of multiple random access channel occasion types, and receive a random access channel preamble in a random access channel occasion associated with a random access channel occasion type.

Another apparatus for wireless communications at a base station is described. The apparatus may include means for determining a set of multiple random access channel occasion types and a channel quality threshold for each random access channel occasion type of the set of multiple random access channel occasion types, means for transmitting, to a UE, control signaling identifying a configuration that indicates the set of multiple random access channel occasion types and the channel quality threshold for each random access channel occasion type of the set of multiple random access channel occasion types, and means for receiving a random access channel preamble in a random access channel occasion associated with a random access channel occasion type.

A non-transitory computer-readable medium storing code for wireless communications at a base station is described. The code may include instructions executable by a processor to determine a set of multiple random access channel occasion types and a channel quality threshold for each random access channel occasion type of the set of multiple random access channel occasion types, transmit, to a UE, control signaling identifying a configuration that indicates the set of multiple random access channel occasion types and the channel quality threshold for each random access channel occasion type of the set of multiple random access channel occasion types, and receive a random access channel preamble in a random access channel occasion associated with a random access channel occasion type.

Some examples of the method, apparatuses, and non-transitory computer-readable medium described herein may further include operations, features, means, or instructions for determining one or more transmission configurations for one or more of the set of multiple random access channel occasion types, where the one or more transmission configurations may be associated with a subset of channel quality thresholds.

In some examples of the method, apparatuses, and non-transitory computer-readable medium described herein, the configuration further indicates the one or more transmission configurations.

Some examples of the method, apparatuses, and non-transitory computer-readable medium described herein may further include operations, features, means, or instructions for determining one or more beam pairs for one or more random access channel occasions, where the one or more beam pairs may be associated with a subset of channel quality thresholds, and where the configuration further indicates the one or more beam pairs.

In some examples of the method, apparatuses, and non-transitory computer-readable medium described herein, the random access channel occasion may be non-overlapping in a time domain with time resources of a downlink transmission.

In some examples of the method, apparatuses, and non-transitory computer-readable medium described herein, the random access channel occasion may be overlapping in a time domain with time resources of a downlink transmission and non-overlapping in a frequency domain with frequency resources of the downlink transmission.

In some examples of the method, apparatuses, and non-transitory computer-readable medium described herein, the random access channel occasion may be separated, in a frequency domain, from frequency resources of the downlink transmission by a guard band.

In some examples of the method, apparatuses, and non-transitory computer-readable medium described herein, the configuration further indicates a characteristic of the guard band based on a channel quality and the channel quality thresholds.

In some examples of the method, apparatuses, and non-transitory computer-readable medium described herein, the random access channel occasion may be overlapping in a time domain with time resources of a downlink transmission, overlapping in a frequency domain with frequency resources of the downlink transmission, and non-overlapping in a spatial domain with spatial resources of the downlink transmission.

Some examples of the method, apparatuses, and non-transitory computer-readable medium described herein may further include operations, features, means, or instructions for transmitting second control signaling identifying an updated configuration, where the channel quality thresholds may be determined based on a channel quality.

In some examples of the method, apparatuses, and non-transitory computer-readable medium described herein, the channel quality thresholds may be indicated by one or more radio resource control parameters in the transmitted control signaling.

In some examples of the method, apparatuses, and non-transitory computer-readable medium described herein, the set of multiple random access channel occasion types include a time division multiplexing type, a frequency division multiplexing type, a spatial division multiplexing type, or a combination thereof.

In some examples of the method, apparatuses, and non-transitory computer-readable medium described herein, each channel quality threshold includes a synchronization signal block threshold or a channel state information reference signal threshold, or both.

DETAILED DESCRIPTION

In some wireless communications systems, wireless devices may communicate in full-duplex (FD) communications, in which a device may transmit transmissions using a first antenna panel while concurrently receiving transmissions using a second antenna panel. In some cases, random access channel (RACH) transmissions may be restricted from FD communications, and instead a user equipment (UE) may wait for a RACH occasion (RO) that is multiplexed with downlink (DL) transmissions according to a time division multiplexing (TDM) scheme, which may result in a long access delay for the UE. It may be beneficial to multiplex RACH transmissions with DL transmissions in FD communications to reduce latency in communications at the UE.

Techniques are described herein for selecting an RO based on one or more channel quality thresholds, such as reference signal received power (RSRP) thresholds. A base station may determine a set of RO types for receiving RACH transmissions. The RO types may include a TDM RO type, a frequency division multiplexing (FDM) RO type, a spatial division multiplexing (SDM) RO type, etc. The base station may determine a channel quality threshold for each RO type. For example, a channel quality threshold for a TDM RO type may be less than a channel quality threshold for an FDM RO type, and the channel quality threshold for an FDM RO type may be less than a channel quality threshold for an SDM RO type. The base station may broadcast a configuration indicating the RO types and the associated channel quality thresholds. A UE may receive the configuration and measure a channel quality between the UE and the base station. Based on the measured channel quality, the UE may determine which RO types are available based on the indicated channel quality thresholds, and select an RO for transmitting a RACH preamble to establish a connection with the base station based on the available RO types. In some examples, one or more RO types (e.g., an FDM RO type, an SDM RO type, among other examples) may include FD communication techniques. The configuration indicating the RO types and associated channel quality thresholds may enable increased system efficiency and reduced latency at the UE, among other benefits.

Aspects of the disclosure are initially described in the context of wireless communications systems. Aspects of the disclosure are further illustrated by and described with reference to transmission schemes, a process flow, apparatus diagrams, system diagrams, and flowcharts that relate to techniques for selecting a random access channel occasion.

Figure 1:
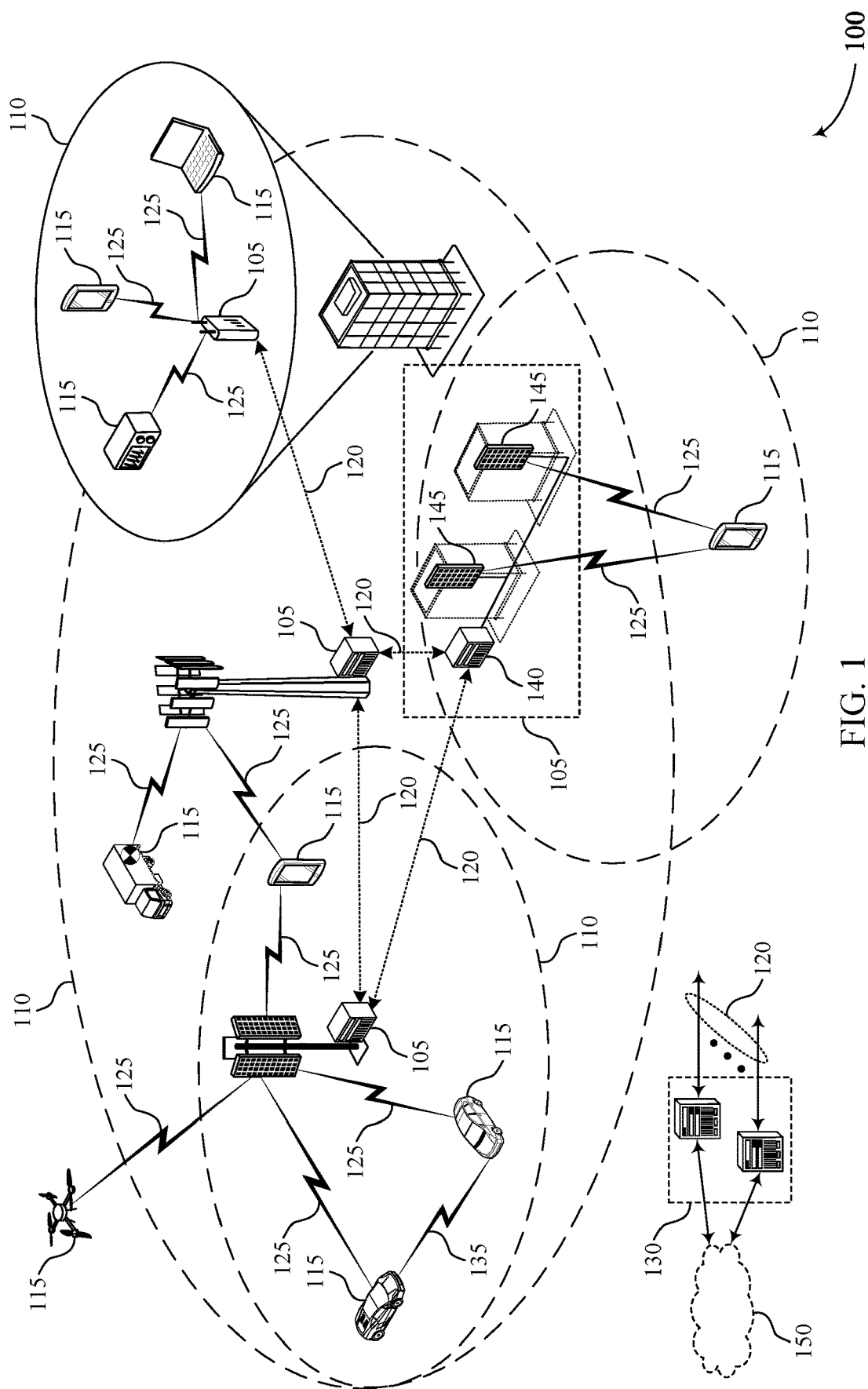
FIG. 1 illustrates an example of a wireless communications system that supports techniques for selecting a random access channel occasion in accordance with aspects of the present disclosure.

FIG. 1 illustrates an example of a wireless communications system 100 that supports techniques for selecting a random access channel occasion in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described herein, a UE 115 may select an RO based on one or more channel quality thresholds, such as RSRP thresholds. A base station 105 may determine a set of RO types for receiving RACH transmissions from UEs 115. The RO types may include a TDM RO type, an FDM RO type, an SDM RO type, etc. The base station 105 may determine a channel quality threshold for each RO type. For example, a channel quality threshold for a TDM RO type may be less than a channel quality threshold for an FDM RO type, and the channel quality threshold for an FDM RO type may be less than a channel quality threshold for an SDM RO type. The base station 105 may broadcast a configuration indicating the RO types and the associated channel quality thresholds. A UE 115 may receive the configuration and measure a channel quality between the UE 115 and the base station 105. Based on the measured channel quality, the UE 115 may determine which RO types are available based on the indicated channel quality thresholds, and select an RO for transmitting a RACH preamble to establish a connection with the base station 105 based on the available RO types. In some examples, one or more RO types (e.g., an FDM RO type, an SDM RO type, among other examples) may include FD communication techniques. The configuration indicating the RO types and associated channel quality thresholds may enable increased system efficiency and reduced latency at the UE 115, among other benefits.

Figure 2:
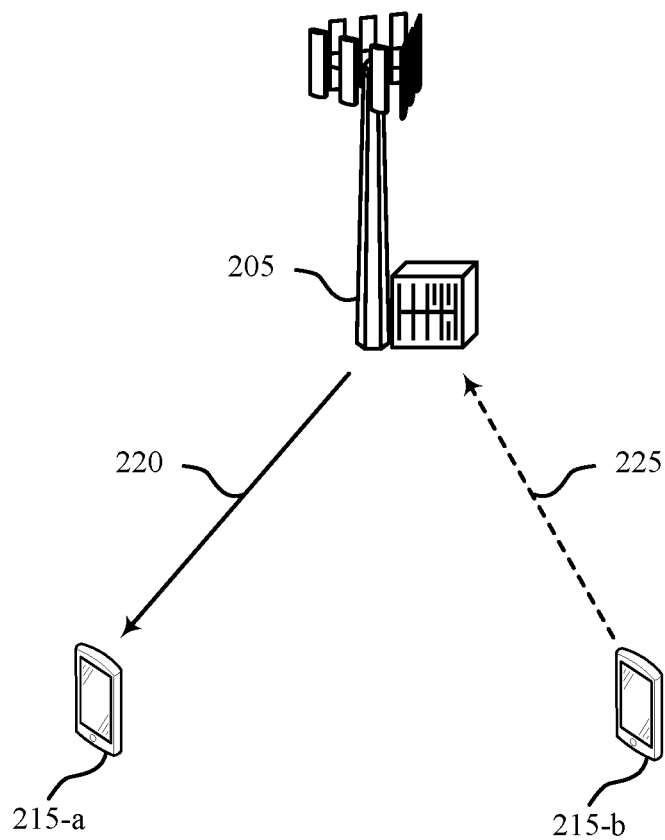
FIG. 2 illustrates an example of a wireless communications system that supports techniques for selecting a random access channel occasion in accordance with aspects of the present disclosure.

FIG. 2 illustrates an example of a wireless communications system 200 that supports techniques for selecting a random access channel occasion in accordance with aspects of the present disclosure. The wireless communications system 200 may include a base station 205, and one or more UEs 215. In some examples, the base station 205 may be capable of operating in an FD mode, in which the base station 205 may transmit downlink (DL) transmissions 220 using a first antenna panel while concurrently receiving uplink (UL) transmissions 225 using a second antenna panel. For example, the base station 205 may transmit a DL transmission 220 to the UE 215-a while concurrently receiving a UL transmission 225 from the second UE 215-b. In some examples, the UE 215-a or the UE 215-b may also communicate in an FD mode (e.g. the first UE 215-a or the second UE 215-b may concurrently transmit and receive signals using different antenna panels). For example, first UE 215-a may receive the DL transmission 220 from the base station 205 while concurrently transmitting to another wireless device (not shown).

In the example shown in FIG. 2, the UE 215-a may receive a DL transmission 220 from the base station 205. In some examples, the UE 215-*b* may also transmit a UL transmission 225 to the base station 205. In some examples, the second UE 215-*b* may transmit the UL transmission 225 in a different time resource than the DL transmission 220, while in some other examples the UE 215-*b* may transmit the UL transmission 225 concurrently (e.g. in the same or overlapping time resource) with the DL transmission 220. In some examples, the DL transmission 220 transmitted from the base station 205 to the first UE 215-*a* may include various types of downlink communications, including control communications, data communications, configuration communications, or other types of communications. For example, the DL transmission 220 may include a synchronization signal block (SSB) transmission, a physical downlink control channel (PDCCH) transmission, a physical downlink shared channel (PDSCH) transmission, a channel state information (CSI) reference signal (CSI-RS) transmission, or other transmissions.

In some examples, the UL transmission 225 may include various types of uplink communications, including control communications, data communications, configuration communications, or other types of communications. In some examples, the UL transmission 225 may comprise a RACH preamble. The UE 215-*b* may transmit the RACH preamble in an RO to initiate a RACH procedure to establish communications with the base station 205. According to the techniques described herein, the UE 215-*b* may select an RO based on one or more channel quality thresholds, such as RSRP thresholds. The base station 205 may determine a set of RO types for receiving RACH transmissions from UEs 215. The RO types may include a TDM RO type, an FDM RO type, an SDM RO type, etc. The base station 205 may determine a channel quality threshold for each RO type. For example, a channel quality threshold for a TDM RO type may be less than a channel quality threshold for an FDM RO type, and the channel quality threshold for an FDM RO type may be less than a channel quality threshold for an SDM RO type. The base station 205 may broadcast a configuration indicating the RO types and the associated channel quality thresholds. The UE 215-*b* may receive the configuration and measure a channel quality between the UE 215-*b* and the base station 205. Based on the measured channel quality, the UE 215-*b* may determine which RO types are available based on the indicated channel quality thresholds, and select an RO for transmitting a RACH preamble to establish a connection with the base station 205 based on the available RO types. In some examples, the RO (e.g., an RO with an FDM RO type or an SDM RO type, among other examples) in which the UE 215-*b* transmits the RACH preamble to the base station 205 may occupy the same time resource in which the base station 205 transmits the DL transmission 220 to the UE 215-*a* (or to UE 215-*b* among other devices). That is, the base station 205 may communicate in an FD mode. As a result, latency may be reduced, spectrum efficiency may be increased, and resource utilization may be more efficient.

Figure 3:
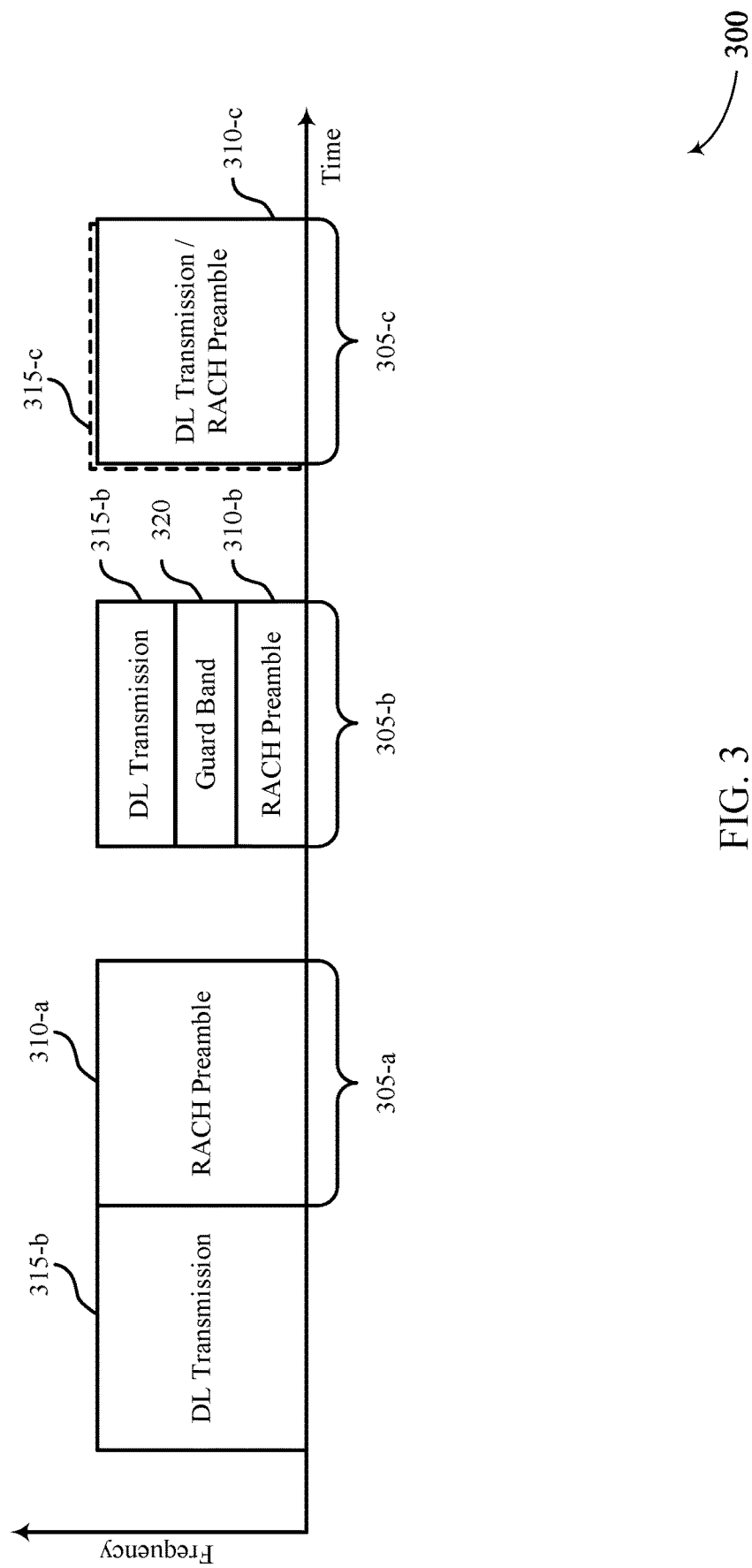
FIG. 3 illustrates an example of a transmission scheme that supports techniques for selecting a random access channel occasion in accordance with aspects of the present disclosure.

FIG. 3 illustrates an example of a transmission scheme 300 that supports techniques for selecting a random access channel occasion in accordance with aspects of the present disclosure. In some examples, the transmission scheme 300 may implement one or more aspects of the wireless communications system 100 or the wireless communications system 200. For example, the transmission scheme 300 may illustrate communications between a base station and one or more UEs, which may be examples of corresponding devices described with reference to FIGS. 1 and 2. The transmission scheme 300 may include features for improved communications reliability, among other benefits. The transmission scheme 300 may include ROs 305 with various RO types, including a TDM RO type, an FDM RO type, and an SDM RO type. For example, an RO 305-*a* may have a TDM RO type, an RO 305-*b* may have an FDM RO type, and an RO 305-*c* may have an SDM RO type. A UE may select an RO 305 with an associated RO type for transmitting a RACH preamble 310 to establish a connection with a base station according to the techniques described herein.

An example of a TDM RO type is illustrated in the RO 305-*a*. In the TDM RO type, the RO 305-*a* that includes a RACH preamble 310-*a* may be non-overlapping in time with a DL transmission 315-*a*. Accordingly, the TDM RO type may be associated with a half-duplex mode at a base station. That is, the base station may transmit the DL transmission 315-*a* to a first UE in first time resources, and the base station may configure the RO 305-*a* in second time resources that are not reserved for the DL transmission 315-*a*. A second UE may transmit the RACH preamble 310-*a* in RO 305-*a*, but because the RO 305-*a* is restricted from FD communications, the second UE may experience an access delay while waiting for the RO 305-*a*. In some examples, the RACH preamble 310-*a* and the DL transmission 315-*a* may occupy at least a portion of the same frequency resources, or they may not occupy the same frequency resources. Since the RACH preamble 310-*a* and the DL transmission 315-*a* do not overlap in time, either option is possible. By scheduling the RO 305-*a* and the DL transmission 315-*a* according to a TDM scheme, the base station may avoid collision or interference between the DL transmission 315-*a* and the RACH preamble 310-*a*, but with increased latency based on the access delay.

An example of an FDM RO type is illustrated in the RO 305-*b*. In the FDM RO type, the RO 305-*b* that includes a RACH preamble 310-*b* may at least partially overlap in the time domain with a DL transmission 315-*b*. Accordingly, the FDM RO type may be associated with an FD mode at a base station. That is, the RO 305-*b* may occupy at least a portion of a time resource associated with the DL transmission 315-*b*. Additionally, in the FDM RO type, the RACH preamble 310-*b* and the DL transmission 315-*b* may occupy different frequency resources, as illustrated in FIG. 3. For example, control signaling may indicate a first set of frequency resources that include the RO 305-*b* in which a UE may transmit the RACH preamble 310-*b*. The control signaling may also indicate a second set of frequency resources in which the base station may transmit the DL transmission 315-*b*. In some examples, the second set of frequency resources may partially overlap. In this way, both the RACH preamble 310-*b* and the DL transmission 315-*b* may be transmitted in at least partially overlapping time resources with reduced or no interference.

In some examples, a guard band 320 may separate the first set of frequency resources and the second set of frequency resources. For example, the control signaling may indicate, either directly or indirectly, the guard band 320 that may occupy a third set of frequency resources between the first set of frequency resources that include the RO 305-*b* and the second set of frequency resources in which the base station may transmit the DL transmission 315-*b*. In some examples, the control signaling may indicate the first set of frequency resources and the second set of frequency resources and not indicate any transmission allocated in the third set of frequency resources corresponding to the guard band 320, implicitly indicating the guard band 320. In other examples, the control signaling may explicitly indicate the third set of frequency resources as reserved for the guard band 320. In this way, the first set of frequency resources and the second set of frequency resources may be separated to reduce interference between the RACH preamble 310-*b* and the DL transmission 315-*b*, as the guard band 320 may act as a buffer or guard in which extraneous signaling from the RACH preamble 310-*b*, or from the DL transmission 315-*b*, or both, may "bleed" or extend in the frequency domain without interfering with each other.

An example of an SDM RO type is illustrated in the RO 305-*c*. In the SDM RO type, the RO 305-*c* that includes a RACH preamble 310-*c* may at least partially overlap in the time domain and the frequency domain with a DL transmission 315-*c*. That is, instead of diversifying in the time domain or in the frequency domain (as discussed in other RO types herein), a UE and the base station may respectively transmit the RACH preamble 310-*c* and the DL transmission 315-*c* over different spatial resources (e.g., spatial layers or beams). Accordingly, the SDM RO type may be associated with an FD mode at the base station.

In some examples, the RO 305-*c* and the DL transmission 315-*c* may be separated in a spatial domain using beamforming, precoding, antenna selection, panel selection, or other spatial diversity techniques. In some examples, control signaling may indicate non-overlapping spatial resources for each of the RO 305-*c* and the DL transmission 315-*c*, such that UEs may communicate with the base station 205 over the non-overlapping spatial resources, while utilizing frequency resources that at least partially overlap and time resources that at least partially overlap. In this way, a UE may transmit the RACH preamble 310-*c* to establish a connection with a base station with less latency, which may increase spectrum efficiency and more efficiently utilize resources.

According to the techniques described herein, a UE may select an RO 305 based on one or more channel quality thresholds, such as RSRP thresholds. A base station may determine a set of RO types (e.g., the TDM RO type, the FDM RO type, the SDM RO type, among other examples) for receiving RACH transmissions from UEs. The base station may determine a channel quality threshold for each RO type. For example, a channel quality threshold for the TDM RO type may be less than a channel quality threshold for the FDM RO type, and the channel quality threshold for the FDM RO type may be less than a channel quality threshold for the SDM RO type. The base station may broadcast a configuration indicating the RO types and the associated channel quality thresholds. The UE may receive the configuration and measure a channel quality between the UE and the base station. Based on the measured channel quality, the UE may determine which RO types are available based on the indicated channel quality thresholds, and select an RO 305 for transmitting a RACH preamble 310 to establish a connection with the base station based on the available RO types. Based on selecting the RO 305 according to the indicated channel quality thresholds, latency may be reduced, spectrum efficiency may be increased, and resource utilization may be more efficient.

Figure 4:
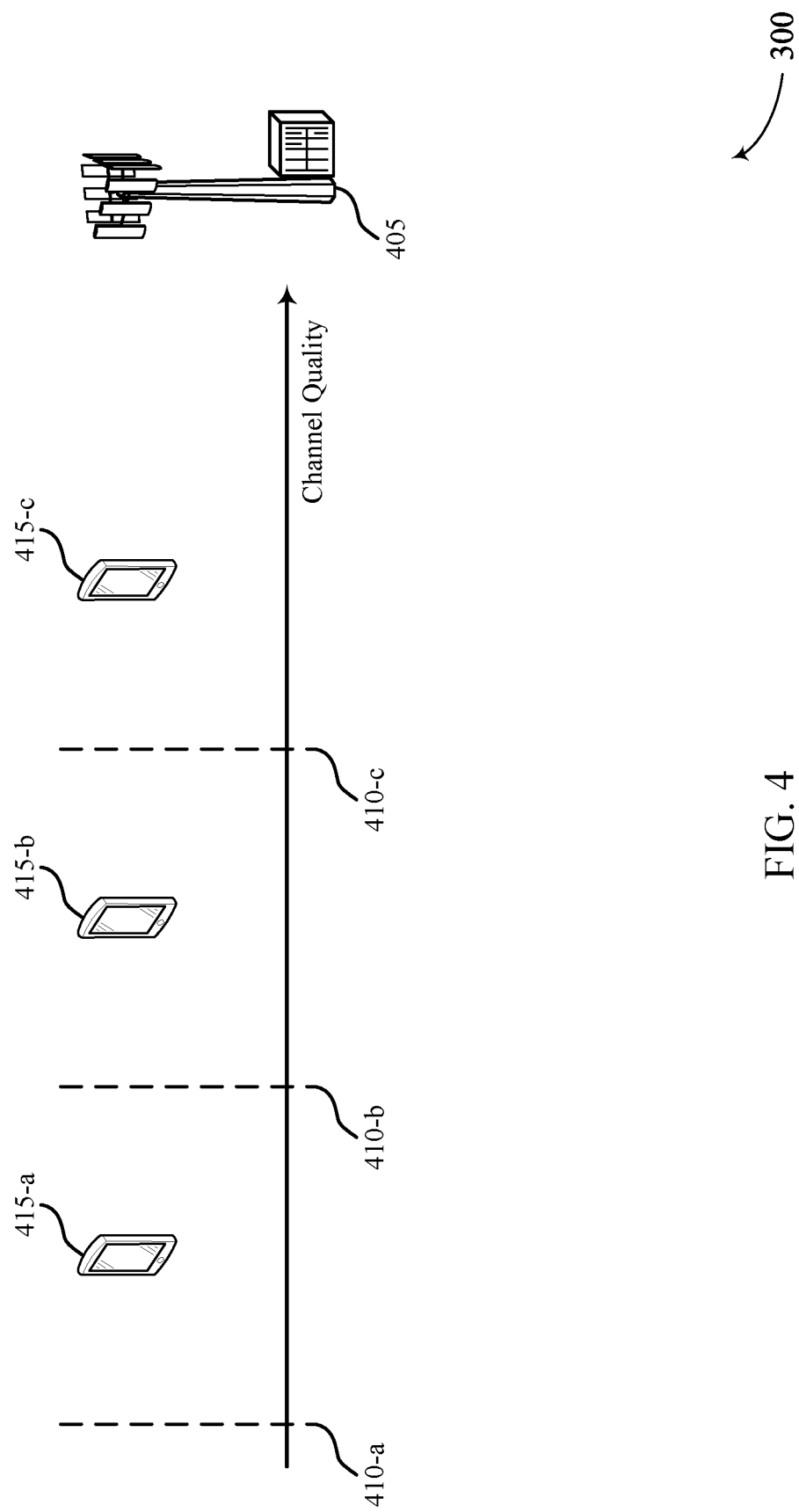
FIG. 4 illustrates an example of a transmission scheme that supports techniques for selecting a random access channel occasion in accordance with aspects of the present disclosure.

FIG. 4 illustrates an example of a transmission scheme 400 that supports techniques for selecting a random access channel occasion in accordance with aspects of the present disclosure. In some examples, the transmission scheme 400 may implement one or more aspects of the wireless communications system 100 or the wireless communications system 200. For example, the transmission scheme 400 may illustrate communications between a base station 405 and one or more UEs 415, which may be examples of corresponding devices described with reference to FIGS. 1 and 2. The transmission scheme 400 may include features for improved communications reliability, among other benefits.

The base station 405 may transmit (e.g., broadcast) a configuration to the UEs 415 indicating a set of channel quality thresholds 410. In some examples, a channel quality threshold 410 may be an RSRP threshold for selection of an SSB associated with a random access procedure. The RSRP threshold for selection of an SSB may be indicated in an rsrp-ThresholdSSB field of an RRC message. Additionally or alternatively, a channel quality threshold 410 may be an RSRP threshold for selection of a CSI-RS associated with a random access procedure. The RSRP threshold for selection of a CSI-RS may be indicated in an rsrp-ThresholdCSI-RS field of an RRC message.

The set of channel quality thresholds 410 may be associated with a set of RO types, a set of RO configurations, or both. The base station 405 may configure ROs, each with an associated RO type (e.g., and an RO configuration) for receiving RACH transmissions from the UEs 415. In some examples, the base station 405 may configure different channel quality thresholds 410 (e.g., SSB or CSI-RS thresholds) for each RO type or RO configuration. For example, the set of RO types may include a TDM RO type, an FDM RO type, an SDM RO type, etc., where each RO type may be configured with a different channel quality threshold 410. Additionally or alternatively, within the same RO type (e.g., the FDM RO type), the base station 405 may signal different configurations with different channel quality thresholds 410. For example, the base station 405 may configure different channel quality thresholds 410 for different guard band configurations of the FDM RO type.

A UE 415 may use the different channel quality thresholds 410 indicated in the configuration broadcast from the base station 405 and measure a channel quality (e.g., an RSRP) to determine which RO type or RO configuration to use for RACH message transmission based on the indicated channel quality thresholds 410. For example, a channel quality threshold 410-*a* for a TDM RO type may be less than a channel quality threshold 410-*b* for an FDM RO type, and the channel quality threshold 410-*b* for an FDM RO type may be less than a channel quality threshold 410-*c* for an SDM RO type. In some examples, the base station may also signal transmission configurations that correspond to channel quality thresholds that fall between the channel quality thresholds corresponding to each RO type. For example, the base station may signal subsets of channel quality thresholds between channel quality threshold 410-*b* and channel quality threshold 410-*c* that correspond to transmission configurations associated with the FDM RO type (e.g., different guard band configurations). As such, in addition to selecting an RO type based on the measured channel quality, the UE may also select a transmission configuration based on the measured channel quality threshold. In some examples the UE 415 may transmit the RACH message (e.g., a RACH preamble) using a selected beam associated with a selected SSB or CSI-RS.

The base station 405 may operate in an FD mode, a half-duplex mode, or both. For example, a UE 415-*a* may measure a channel quality that exceeds the channel quality threshold 410-*a* but does not exceed the channel quality thresholds 410-*b* and 410-*c*. Accordingly, the UE 415-*a* may use a TDM RO type or configuration (e.g., using a half-duplex mode) to guarantee UL reception of a RACH transmission at the base station 405. In some examples, a UE 415-*b* may measure a channel quality that exceeds the channel quality threshold 410-*b*, and accordingly use an FDM RO type or configuration (e.g., using an FD mode).

Similarly, a UE 415-*c* may measure a channel quality that exceeds the channel quality threshold 410-*c*, and accordingly use an SDM RO type or configuration (e.g., using an FD mode). In some examples, the base station 405 may configure different channel quality thresholds 410 for different beam pairs for ROs, which may improve the RO selection process at a UE 415.

In some examples, the base station 405 may determine the channel quality thresholds 410 based on one or more parameters. For example, the parameters may include a UL target signal to interference plus noise ratio (SINR), a UL maximum transmission power (which may be referred to as a UL max Tx power), a transmission path loss (PL), a DL FD interference parameter, an SSB transmission power (which may be referred to as an SSB Tx power), among other parameters. In some examples, the base station 405 may determine that UL target SINR<UL max Tx power−PL−DL FD interference. The base station 405 may thus determine that an RSRP of an SSB at a UE 415 is SSB RSRP=SSB Tx power−PL>SSB Tx power−(UL max Tx power−DL FD interference−UL target SINR). Accordingly, the SSB RSRP may exceed an SSB RSRP threshold when SSB RSRP>UL target SINR+SSB Tx power+DL FD interference−UL max Tx power=SSB RSRP threshold. In some examples, the DL FD interference may be an averaged value per RO type or RO configuration. Additionally or alternatively, the DL FD interference may be an accurate vale per beam pair per RO. In some examples, the base station 405 may broadcast the configuration when a UE 415 is at an initial stage of establishing a connection with the base station 405. Additionally or alternatively, the base station 405 may transmit a UE-specific configuration to a UE 415 indicating that a connected mode at the UE 415 is to be updated, activated, or deactivated. In some examples, the base station 405 may determine a CSI-RS RSRP threshold based on a similar set of parameters.

In some examples, the base station 405 may determine the channel quality thresholds 410 to ensure a transmission and reception timing alignment (e.g., within a cyclic prefix (CP)) in the FD mode at the base station 405, for example when transmitting a DL transmission and receiving a RACH transmission. For example, the closer a UE 415 is to the base station 405, the lower a propagation delay on the link, and the more aligned the timing may be for transmission and reception at the base station 405. Accordingly, the base station 405 may configure the channel quality thresholds 410 for selecting an FD RO such that UEs 415 with a small propagation delay (e.g., a higher RSRP) may select the FD RO. This may improve the timing alignment for transmission and reception in the FD mode at the base station 405.

Figure 5:
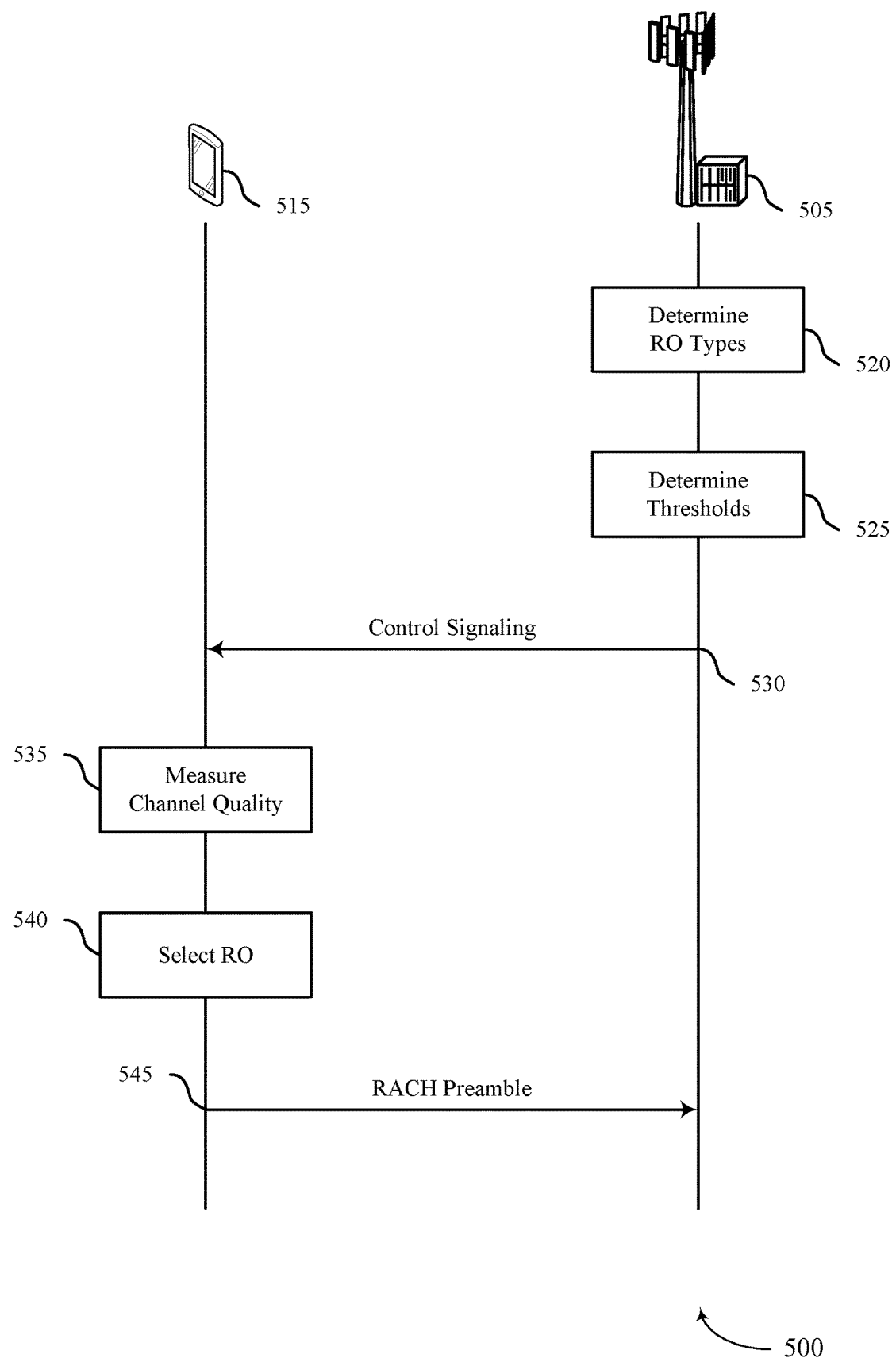
FIG. 5 illustrates an example of a process flow that supports techniques for selecting a random access channel occasion in accordance with aspects of the present disclosure.

FIG. 5 illustrates an example of a process flow 500 that supports techniques for selecting a random access channel occasion in accordance with aspects of the present disclosure. In some examples, the process flow 500 may implement one or more aspects of wireless communications systems 100 and 200. For example, the process flow 500 may include example operations associated with one or more of a base station 505 or a UE 515, which may be examples of corresponding devices described with reference to FIGS. 1 and 2. In the following description of the process flow 500, the operations between the base station 505 and the UE 515 may be performed in a different order than the example order shown, or the operations performed by the base station 505 and the UE 515 may be performed in different orders or at different times. Some operations may also be omitted from the process flow 500, and other operations may be added to the process flow 500. The operations performed by the base station 505 and the UE 515 may support improvements to RACH operations and, in some examples, may promote improvements to communications efficiency, among other benefits.

At 520, the base station 505 may determine a set of RO types associated with ROs for receiving RACH transmissions from the UE 515. For example, the set of RO types may include a TDM RO type, an FDM RO type, an SDM RO type, etc. Additionally or alternatively, within the same RO type (e.g., the FDM RO type), the base station 505 may determine one or more RO configurations, which may be referred to as transmission configurations. For example, the base station 405 may determine one or more guard band configurations for the FDM RO type. The channel quality thresholds associated with these transmission configurations may correspond to subsets of channel quality thresholds within the range of channel quality thresholds corresponding to a particular RO type. In some examples, the base station 505 may determine one or more beam pairs for ROs with associated RO types, which may improve the RO selection process at the UE 515.

At 525, the base station 505 may determine a set of channel quality thresholds, where the set may include a channel quality threshold for each RO type of the set of RO types. For example, a channel quality threshold for the TDM RO type may be less than a channel quality threshold for the FDM RO type, and the channel quality threshold for the FDM RO type may be less than a channel quality threshold for the SDM RO type. In some examples, the base station 505 may determine a channel quality threshold for each RO configuration within the RO types. Additionally or alternatively, the base station 505 may determine a channel quality threshold for each beam pair for the ROs with associated RO types. In some examples, the channel quality thresholds may include RSRP thresholds, such as SSB or CSI-RS RSRP thresholds. In some examples, the base station 505 may determine the channel quality thresholds to ensure a transmission and reception timing alignment (e.g., within a CP) in an FD mode at the base station 505.

At 530, the base station 505 may transmit control signaling to the UE 515. The control signaling may include or identify a configuration that indicates the determined RO types and associated channel quality thresholds. In some examples, the configuration may also indicate the determined RO configurations, the determined beam pairs, or both, and the associated channel quality thresholds. In some examples, the control signaling may include an RRC message. Additionally or alternatively, the base station 505 may broadcast the control signaling to the UE 515 and one or more additional UEs (not shown). In some examples, the base station 505 may transmit an updated configuration, for example based on updated channel conditions or changes in parameters the base station 505 may use to determine the channel quality thresholds. In some examples, the base station 505 may transmit control signaling to the UE 515 that includes a UE-specific configuration indicating that a connected mode at the UE 515 is to be updated, activated, or deactivated.

At 535, the UE 515 may measure a channel quality (e.g., an RSRP) based on receiving the control signaling. For example, the UE 515 may receive one or more reference signals (e.g., SSB or CSI-RS) from the base station 505 and measure an RSRP for the received reference signals. In some examples, the UE 515 may compare the measured channel quality to the channel quality thresholds indicated in the control signaling.

At 540, the UE 515 may select an RO for transmitting a RACH preamble to the base station 505 to establish or update a connection with the base station 505. For example, based on measuring the channel quality, the UE 515 may select an RO type indicated in the configuration. In some examples, the UE 515 may select an RO configuration, a beam pair in the RO, or both, based on the measured channel quality.

At 545, the UE 515 may transmit the RACH preamble to the base station 505 in the selected RO according to the selected RO type. In some examples the UE 515 may transmit the RACH preamble according to the selected RO configuration. Additionally or alternatively, UE 515 may transmit the RACH preamble using the selected beam pair in the RO. The operations performed by the base station 505 and the UE 515 may support improvements to RACH operations and, in some examples, may promote improvements to communications efficiency, among other benefits.

Figure 6:
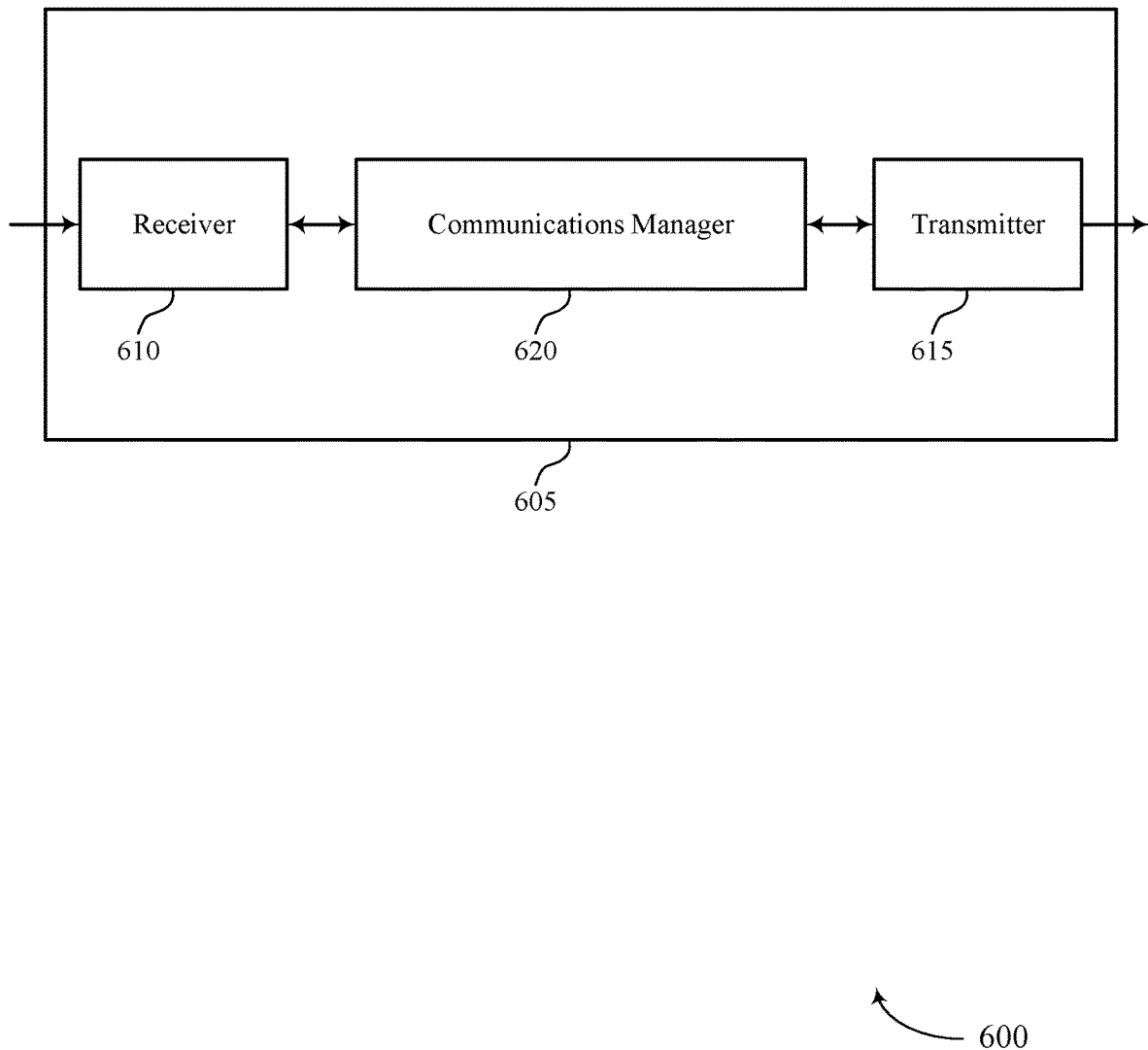
FIGS. 6 and 7 show block diagrams of devices that support techniques for selecting a random access channel occasion in accordance with aspects of the present disclosure.

FIG. 6 shows a block diagram 600 of a device 605 that supports techniques for selecting a random access channel occasion in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for selecting a random access channel occasion). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for selecting a random access channel occasion). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for selecting a random access channel occasion as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station, control signaling identifying a configuration that indicates a set of multiple random access channel occasion types and a channel quality threshold for each random access channel occasion type of the set of multiple random access channel occasion types. The communications manager 620 may be configured as or otherwise support a means for selecting, based on the configuration and a channel quality between the UE and the base station, a random access channel occasion type of the set of multiple random access channel occasion types and a random access channel occasion associated with the selected random access channel occasion type. The communications manager 620 may be configured as or otherwise support a means for transmitting a random access channel preamble in the selected random access channel occasion according to the selected random access channel occasion type.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for efficient power consumption, more efficient utilization of communication resources, and reduced latency in RACH transmissions.

Figure 7:
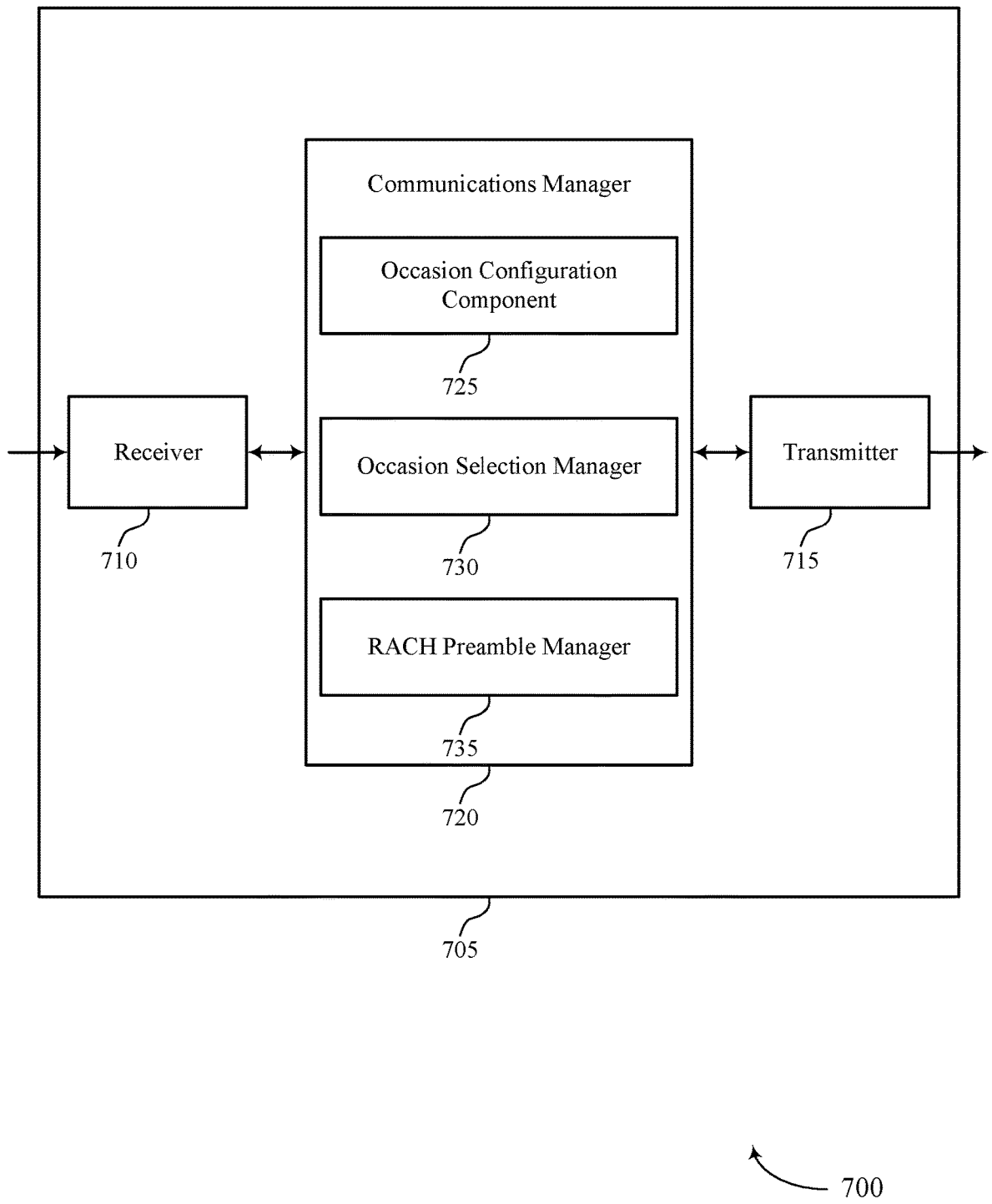

FIG. 7 shows a block diagram 700 of a device 705 that supports techniques for selecting a random access channel occasion in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for selecting a random access channel occasion). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for selecting a random access channel occasion). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for selecting a random access channel occasion as described herein. For example, the communications manager 720 may include an occasion configuration component 725, an occasion selection manager 730, a RACH preamble manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The occasion configuration component 725 may be configured as or otherwise support a means for receiving, from a base station, control signaling identifying a configuration that indicates a set of multiple random access channel occasion types and a channel quality threshold for each random access channel occasion type of the set of multiple random access channel occasion types. The occasion selection manager 730 may be configured as or otherwise support a means for selecting, based on the configuration and a channel quality between the UE and the base station, a random access channel occasion type of the set of multiple random access channel occasion types and a random access channel occasion associated with the selected random access channel occasion type. The RACH preamble manager 735 may be configured as or otherwise support a means for transmitting a random access channel preamble in the selected random access channel occasion according to the selected random access channel occasion type.

Figure 8:
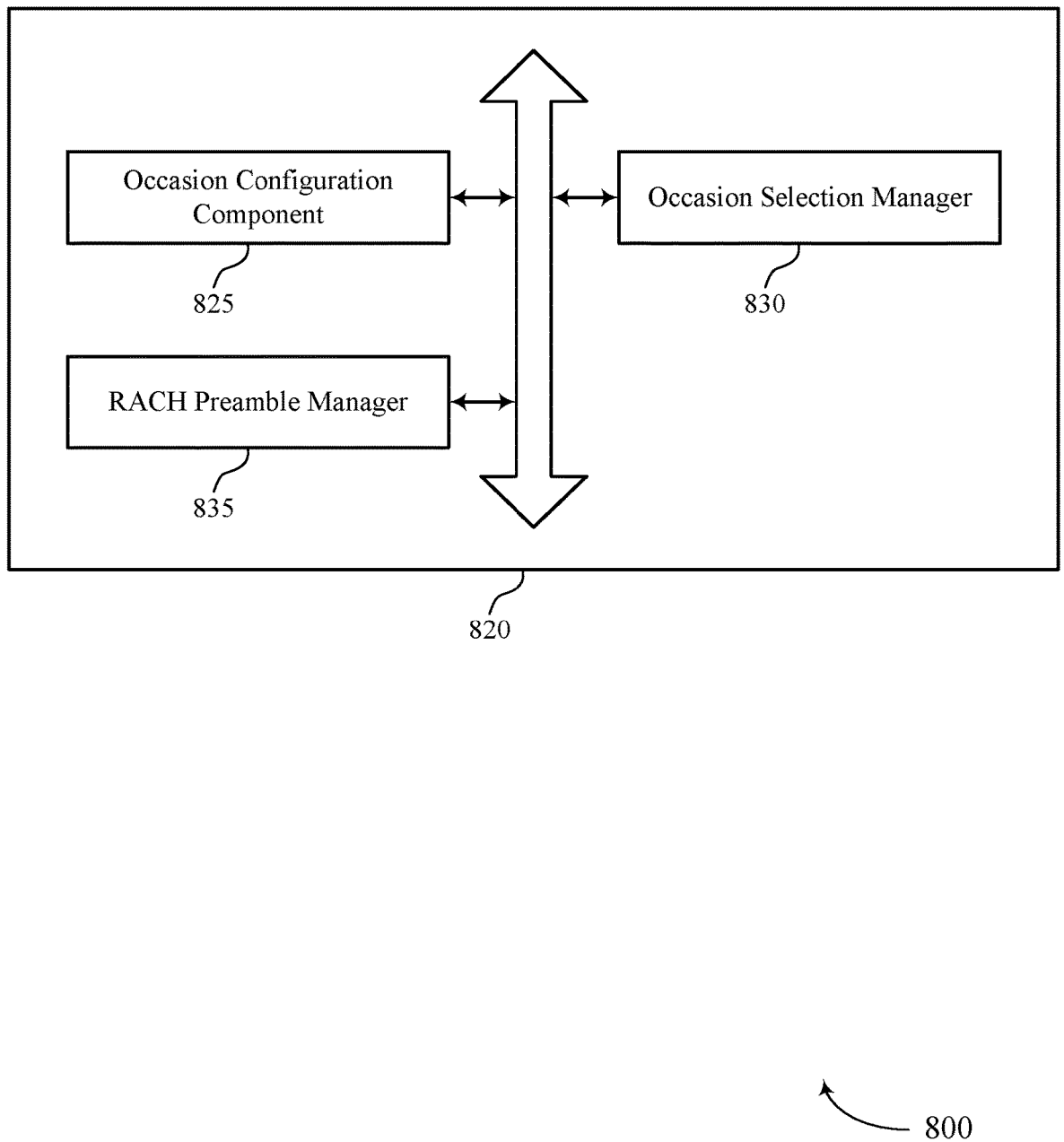
FIG. 8 shows a block diagram of a communications manager that supports techniques for selecting a random access channel occasion in accordance with aspects of the present disclosure.

FIG. 8 shows a block diagram 800 of a communications manager 820 that supports techniques for selecting a random access channel occasion in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for selecting a random access channel occasion as described herein. For example, the communications manager 820 may include an occasion configuration component 825, an occasion selection manager 830, a RACH preamble manager 835, or any combination thereof. Each of these components may communicate, directly or indirectly, with one another (e.g., via one or more buses).

The communications manager 820 may support wireless communications at a UE in accordance with examples as disclosed herein. The occasion configuration component 825 may be configured as or otherwise support a means for receiving, from a base station, control signaling identifying a configuration that indicates a set of multiple random access channel occasion types and a channel quality threshold for each random access channel occasion type of the set of multiple random access channel occasion types. The occasion selection manager 830 may be configured as or otherwise support a means for selecting, based on the configuration and a channel quality between the UE and the base station, a random access channel occasion type of the set of multiple random access channel occasion types and a random access channel occasion associated with the selected random access channel occasion type. The RACH preamble manager 835 may be configured as or otherwise support a means for transmitting a random access channel preamble in the selected random access channel occasion according to the selected random access channel occasion type.

In some examples, the configuration further indicates one or more transmission configurations for one or more of the set of multiple random access channel occasion types. In some examples, the one or more transmission configurations are associated with a subset of channel quality thresholds.

In some examples, the occasion selection manager 830 may be configured as or otherwise support a means for selecting a transmission configuration associated with the selected random access channel occasion type based on the configuration and the subset of channel quality thresholds.

In some examples, the configuration further indicates one or more beam pairs for one or more random access channel occasions, the one or more random access channel occasions including the selected random access channel occasion. In some examples, the one or more beam pairs are associated with a subset of channel quality thresholds.

In some examples, the occasion selection manager 830 may be configured as or otherwise support a means for selecting a beam pair associated with the selected random access channel occasion based on the configuration and the subset of channel quality thresholds.

In some examples, the selected random access channel occasion is non-overlapping in a time domain with time resources of a downlink transmission.

In some examples, the selected random access channel occasion is overlapping in a time domain with time resources of a downlink transmission and non-overlapping in a frequency domain with frequency resources of the downlink transmission.

In some examples, the selected random access channel occasion is separated, in a frequency domain, from frequency resources of the downlink transmission by a guard band.

In some examples, the configuration further indicates a characteristic of the guard band based on the channel quality and the one or more channel quality thresholds.

In some examples, the selected random access channel occasion is overlapping in a time domain with time resources of a downlink transmission, overlapping in a frequency domain with frequency resources of the downlink transmission, and non-overlapping in a spatial domain with spatial resources of the downlink transmission.

In some examples, the occasion configuration component 825 may be configured as or otherwise support a means for receiving second control signaling identifying an updated configuration, where selecting the random access channel occasion type and the random access channel occasion is based on the updated configuration, and where the one or more channel quality thresholds are determined based on the channel quality.

In some examples, the one or more channel quality thresholds are indicated by one or more radio resource control parameters in the received control signaling.

In some examples, to support selecting the random access channel occasion type, the occasion selection manager 830 may be configured as or otherwise support a means for comparing the channel quality with the channel quality threshold for each random access channel occasion type.

In some examples, the set of multiple random access channel occasion types include a time division multiplexing type, a frequency division multiplexing type, a spatial division multiplexing type, or a combination thereof.

In some examples, each channel quality threshold includes a synchronization signal block threshold or a channel state information reference signal threshold, or both.

Figure 9:
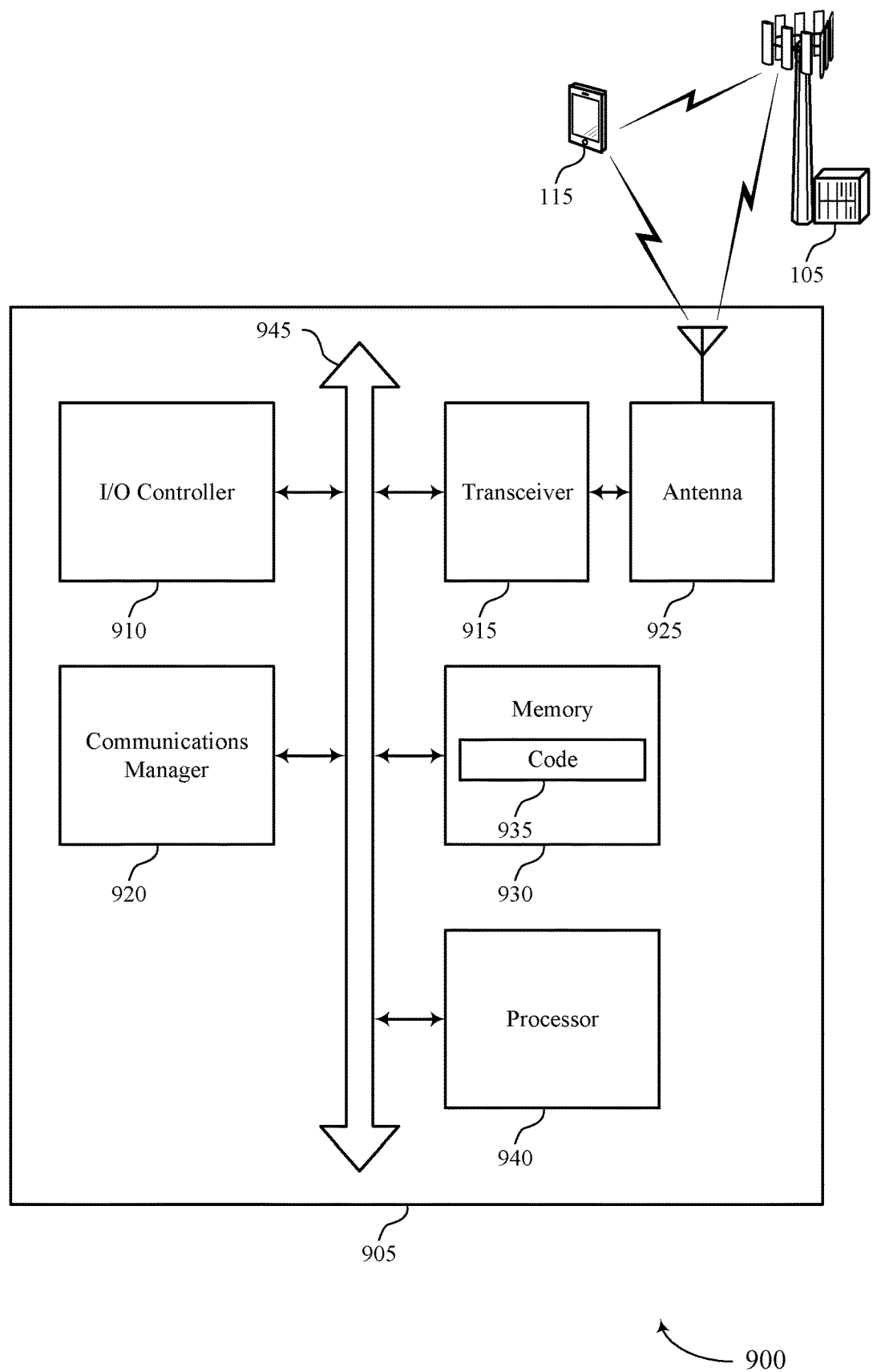
FIG. 9 shows a diagram of a system including a device that supports techniques for selecting a random access channel occasion in accordance with aspects of the present disclosure.

FIG. 9 shows a diagram of a system 900 including a device 905 that supports techniques for selecting a random access channel occasion in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for selecting a random access channel occasion). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station, control signaling identifying a configuration that indicates a set of multiple random access channel occasion types and a channel quality threshold for each random access channel occasion type of the set of multiple random access channel occasion types. The communications manager 920 may be configured as or otherwise support a means for selecting, based on the configuration and a channel quality between the UE and the base station, a random access channel occasion type of the set of multiple random access channel occasion types and a random access channel occasion associated with the selected random access channel occasion type. The communications manager 920 may be configured as or otherwise support a means for transmitting a random access channel preamble in the selected random access channel occasion according to the selected random access channel occasion type.

By including or configuring the communications manager 920 in accordance with examples as described herein, the device 905 may support techniques for improved communication reliability, improved user experience related to increased data throughput, more efficient utilization of communication resources, improved coordination between devices, and reduced latency.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for selecting a random access channel occasion as described herein, or the processor 940 and the memory 930 may be otherwise configured to perform or support such operations.

Figure 10:
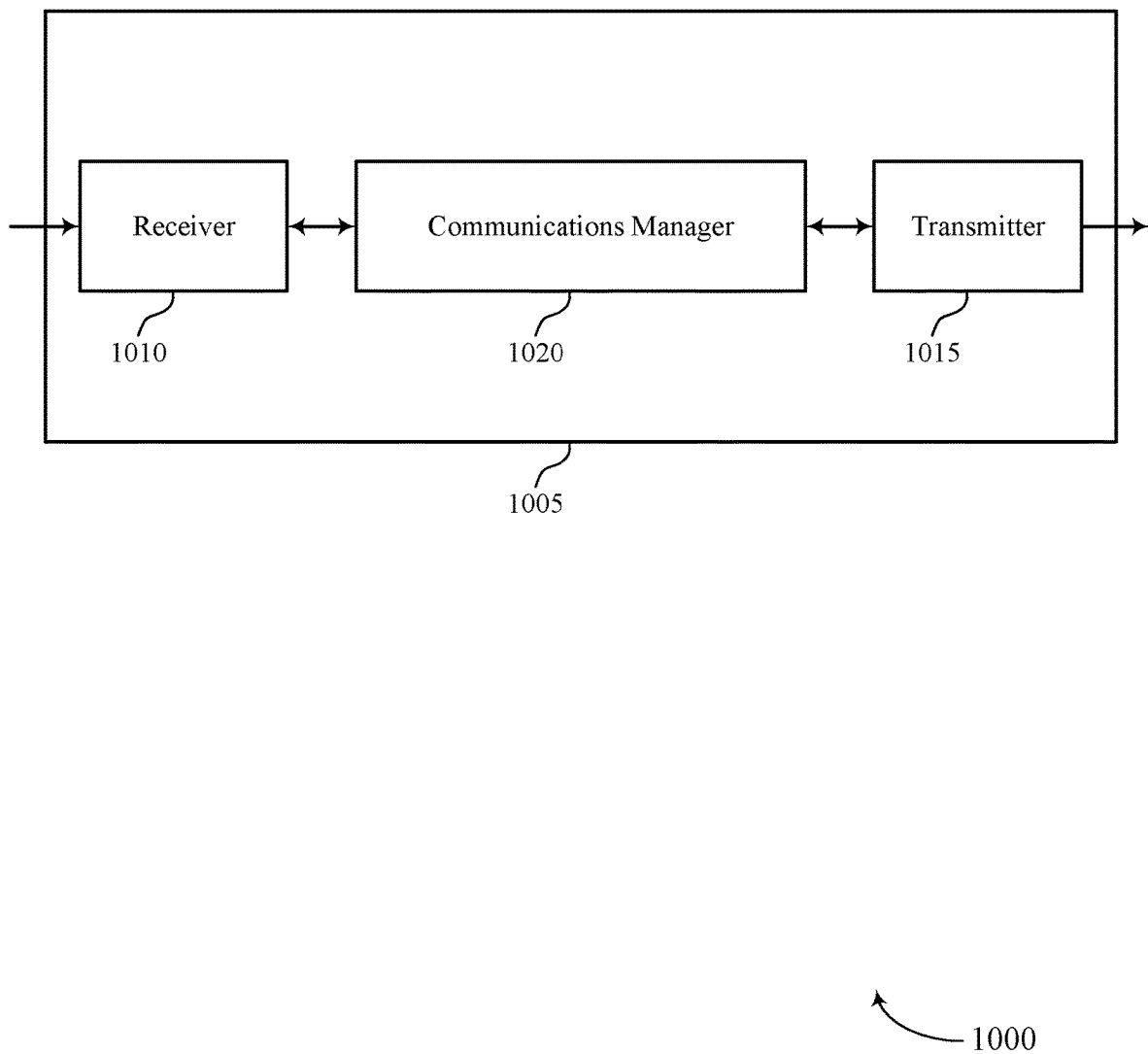
FIGS. 10 and 11 show block diagrams of devices that support techniques for selecting a random access channel occasion in accordance with aspects of the present disclosure.

FIG. 10 shows a block diagram 1000 of a device 1005 that supports techniques for selecting a random access channel occasion in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for selecting a random access channel occasion). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for selecting a random access channel occasion). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for selecting a random access channel occasion as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for determining a set of multiple random access channel occasion types and a channel quality threshold for each random access channel occasion type of the set of multiple random access channel occasion types. The communications manager 1020 may be configured as or otherwise support a means for transmitting, to a UE, control signaling identifying a configuration that indicates the set of multiple random access channel occasion types and the channel quality threshold for each random access channel occasion type of the set of multiple random access channel occasion types. The communications manager 1020 may be configured as or otherwise support a means for receiving a random access channel preamble in a random access channel occasion associated with a random access channel occasion type.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for efficient power consumption, more efficient utilization of communication resources, and reduced latency in RACH transmissions.

Figure 11:
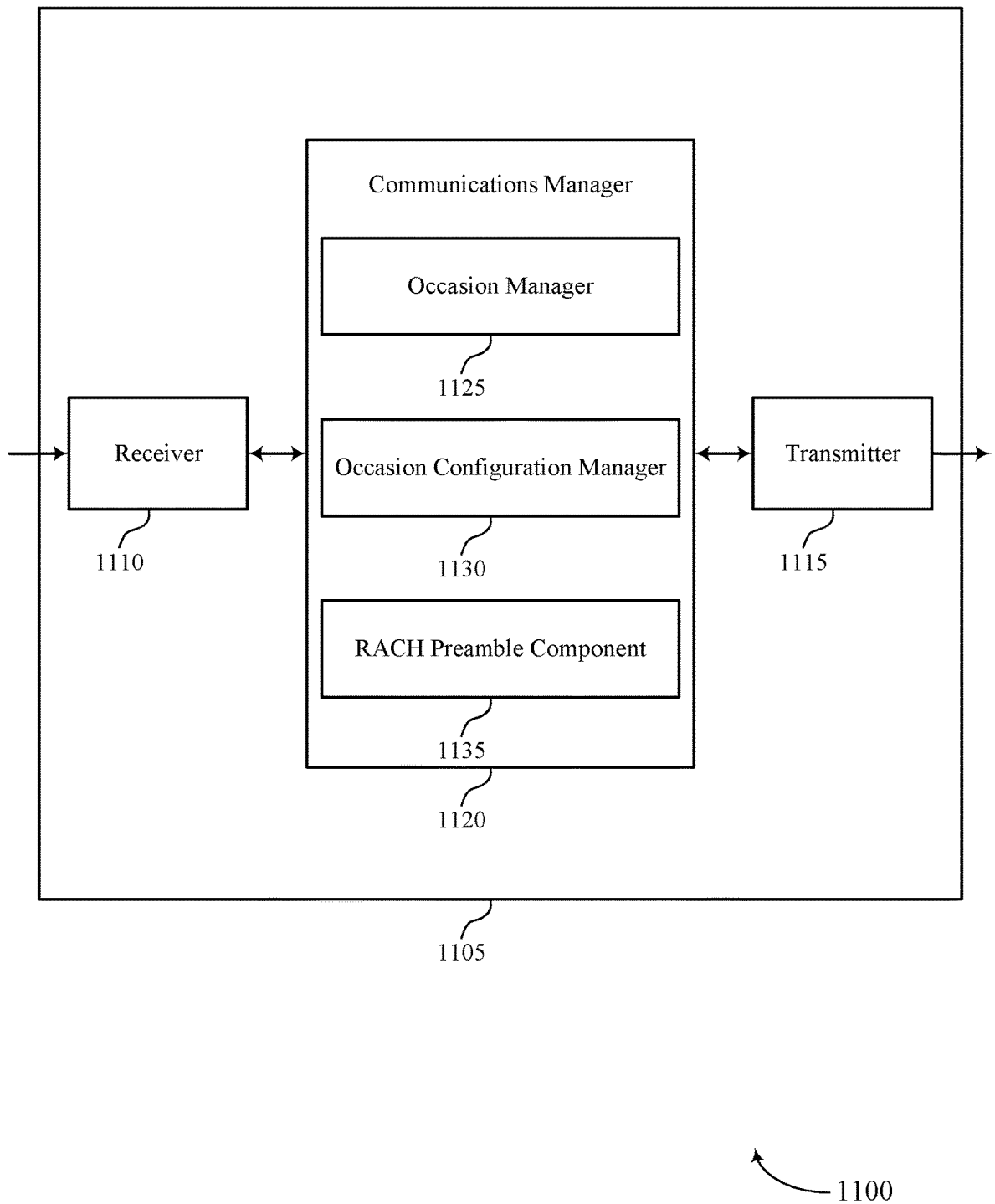

FIG. 11 shows a block diagram 1100 of a device 1105 that supports techniques for selecting a random access channel occasion in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for selecting a random access channel occasion). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for selecting a random access channel occasion). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for selecting a random access channel occasion as described herein. For example, the communications manager 1120 may include an occasion manager 1125, an occasion configuration manager 1130, a RACH preamble component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The occasion manager 1125 may be configured as or otherwise support a means for determining a set of multiple random access channel occasion types and a channel quality threshold for each random access channel occasion type of the set of multiple random access channel occasion types. The occasion configuration manager 1130 may be configured as or otherwise support a means for transmitting, to a UE, control signaling identifying a configuration that indicates the set of multiple random access channel occasion types and the channel quality threshold for each random access channel occasion type of the set of multiple random access channel occasion types. The RACH preamble component 1135 may be configured as or otherwise support a means for receiving a random access channel preamble in a random access channel occasion associated with a random access channel occasion type.

Figure 12:
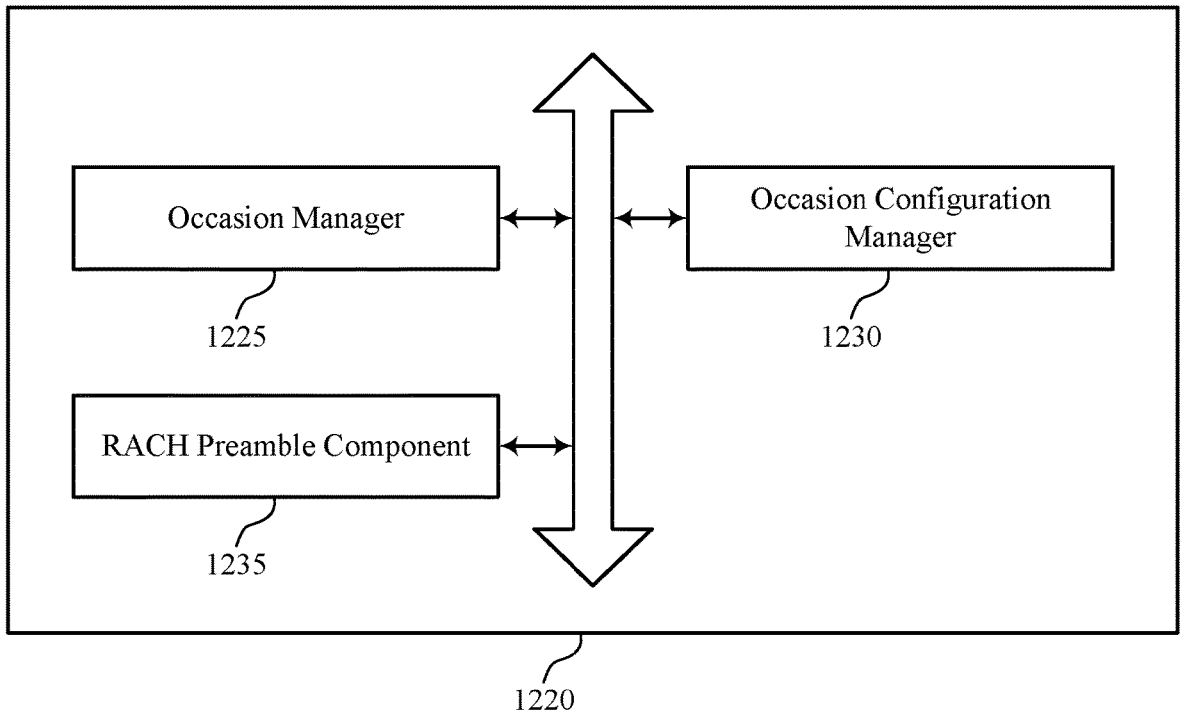
FIG. 12 shows a block diagram of a communications manager that supports techniques for selecting a random access channel occasion in accordance with aspects of the present disclosure.

FIG. 12 shows a block diagram 1200 of a communications manager 1220 that supports techniques for selecting a random access channel occasion in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for selecting a random access channel occasion as described herein. For example, the communications manager 1220 may include an occasion manager 1225, an occasion configuration manager 1230, a RACH preamble component 1235, or any combination thereof. Each of these components may communicate, directly or indirectly, with one another (e.g., via one or more buses).

The communications manager 1220 may support wireless communications at a base station in accordance with examples as disclosed herein. The occasion manager 1225 may be configured as or otherwise support a means for determining a set of multiple random access channel occasion types and a channel quality threshold for each random access channel occasion type of the set of multiple random access channel occasion types. The occasion configuration manager 1230 may be configured as or otherwise support a means for transmitting, to a UE, control signaling identifying a configuration that indicates the set of multiple random access channel occasion types and the channel quality threshold for each random access channel occasion type of the set of multiple random access channel occasion types. The RACH preamble component 1235 may be configured as or otherwise support a means for receiving a random access channel preamble in a random access channel occasion associated with a random access channel occasion type.

In some examples, the occasion configuration manager 1230 may be configured as or otherwise support a means for determining one or more transmission configurations for one or more of the set of multiple random access channel occasion types, where the one or more transmission configurations are associated with a subset of channel quality thresholds.

In some examples, the configuration further indicates the one or more transmission configurations.

In some examples, the occasion configuration manager 1230 may be configured as or otherwise support a means for determining one or more beam pairs for one or more random access channel occasions, where the one or more beam pairs are associated with a subset of channel quality thresholds, and where the configuration further indicates the one or more beam pairs.

In some examples, the random access channel occasion is non-overlapping in a time domain with time resources of a downlink transmission.

In some examples, the random access channel occasion is overlapping in a time domain with time resources of a downlink transmission and non-overlapping in a frequency domain with frequency resources of the downlink transmission.

In some examples, the random access channel occasion is separated, in a frequency domain, from frequency resources of the downlink transmission by a guard band.

In some examples, the configuration further indicates a characteristic of the guard band based on a channel quality and the channel quality thresholds.

In some examples, the random access channel occasion is overlapping in a time domain with time resources of a downlink transmission, overlapping in a frequency domain with frequency resources of the downlink transmission, and non-overlapping in a spatial domain with spatial resources of the downlink transmission.

In some examples, the occasion configuration manager 1230 may be configured as or otherwise support a means for transmitting second control signaling identifying an updated configuration, where the channel quality thresholds are determined based on a channel quality.

In some examples, the channel quality thresholds are indicated by one or more radio resource control parameters in the transmitted control signaling.

In some examples, the set of multiple random access channel occasion types include a time division multiplexing type, a frequency division multiplexing type, a spatial division multiplexing type, or a combination thereof.

In some examples, each channel quality threshold includes a synchronization signal block threshold or a channel state information reference signal threshold, or both.

Figure 13:
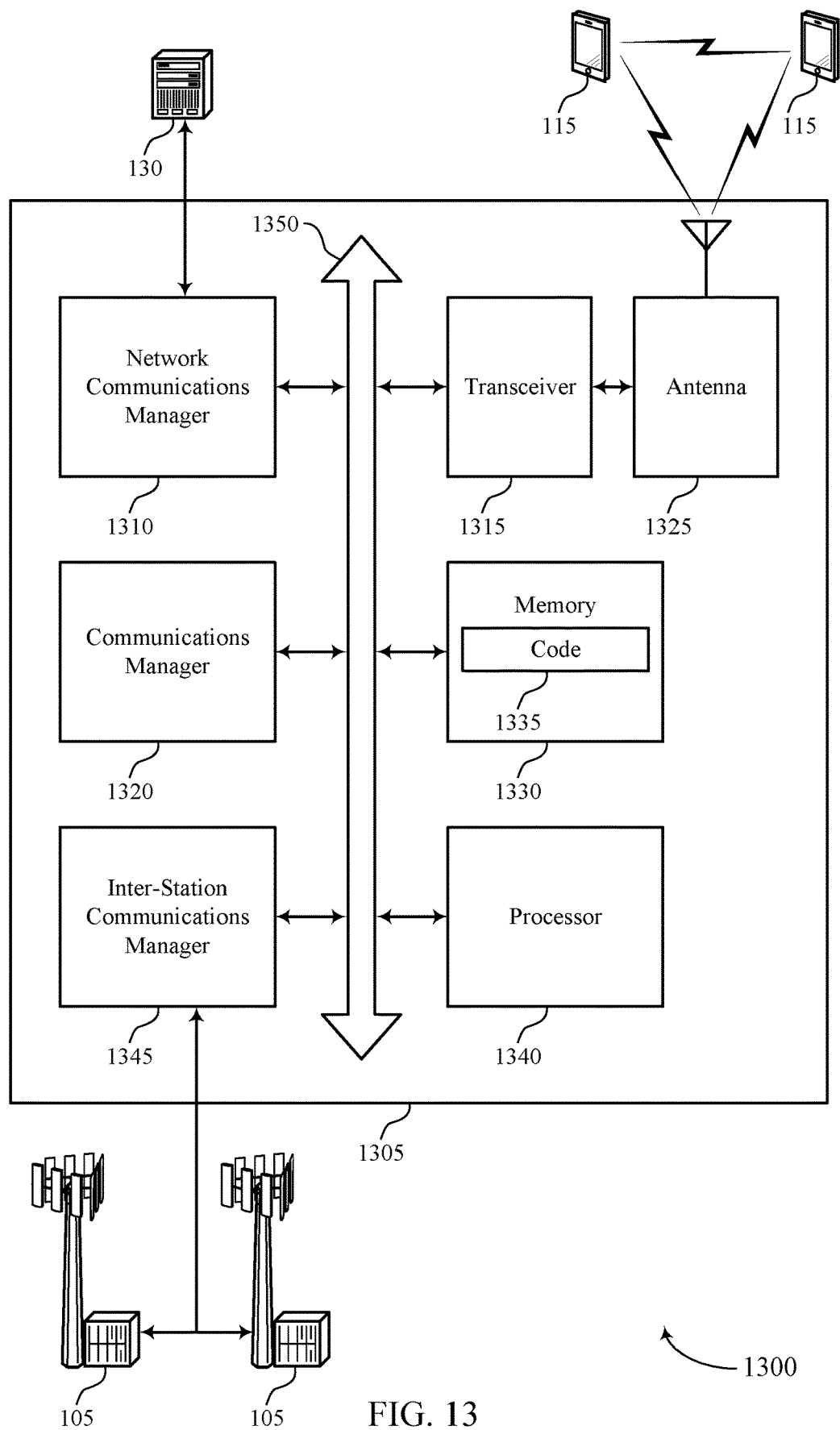
FIG. 13 shows a diagram of a system including a device that supports techniques for selecting a random access channel occasion in accordance with aspects of the present disclosure.

FIG. 13 shows a diagram of a system 1300 including a device 1305 that supports techniques for selecting a random access channel occasion in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for selecting a random access channel occasion). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for determining a set of multiple random access channel occasion types and a channel quality threshold for each random access channel occasion type of the set of multiple random access channel occasion types. The communications manager 1320 may be configured as or otherwise support a means for transmitting, to a UE, control signaling identifying a configuration that indicates the set of multiple random access channel occasion types and the channel quality threshold for each random access channel occasion type of the set of multiple random access channel occasion types. The communications manager 1320 may be configured as or otherwise support a means for receiving a random access channel preamble in a random access channel occasion associated with a random access channel occasion type.

By including or configuring the communications manager 1320 in accordance with examples as described herein, the device 1305 may support techniques for improved communication reliability, improved user experience related to increased data throughput, more efficient utilization of communication resources, improved coordination between devices, and reduced latency.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for selecting a random access channel occasion as described herein, or the processor 1340 and the memory 1330 may be otherwise configured to perform or support such operations.

Figure 14:
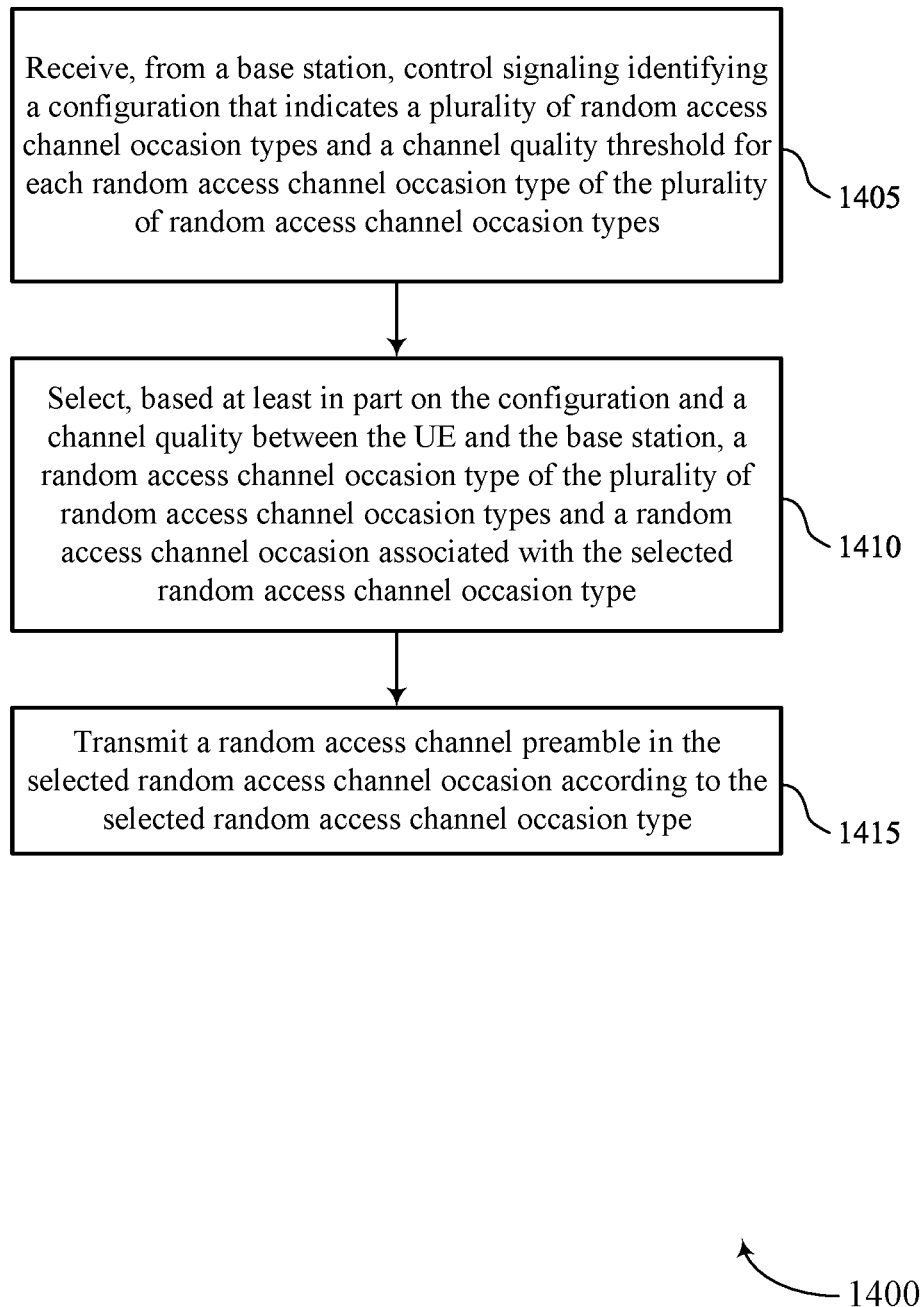
FIGS. 14 through 19 show flowcharts illustrating methods that support techniques for selecting a random access channel occasion in accordance with aspects of the present disclosure.

FIG. 14 shows a flowchart illustrating a method 1400 that supports techniques for selecting a random access channel occasion in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling identifying a configuration that indicates a set of multiple random access channel occasion types and a channel quality threshold for each random access channel occasion type of the set of multiple random access channel occasion types. The operations of 1405 may be performed in accordance with examples as disclosed herein. In some examples, aspects of the operations of 1405 may be performed by an occasion configuration component 825 as described with reference to FIG. 8.

At 1410, the method may include selecting, based on the configuration and a channel quality between the UE and the base station, a random access channel occasion type of the set of multiple random access channel occasion types and a random access channel occasion associated with the selected random access channel occasion type. The operations of 1410 may be performed in accordance with examples as disclosed herein. In some examples, aspects of the operations of 1410 may be performed by an occasion selection manager 830 as described with reference to FIG. 8.

At 1415, the method may include transmitting a random access channel preamble in the selected random access channel occasion according to the selected random access channel occasion type. The operations of 1415 may be performed in accordance with examples as disclosed herein. In some examples, aspects of the operations of 1415 may be performed by a RACH preamble manager 835 as described with reference to FIG. 8.

Figure 15:
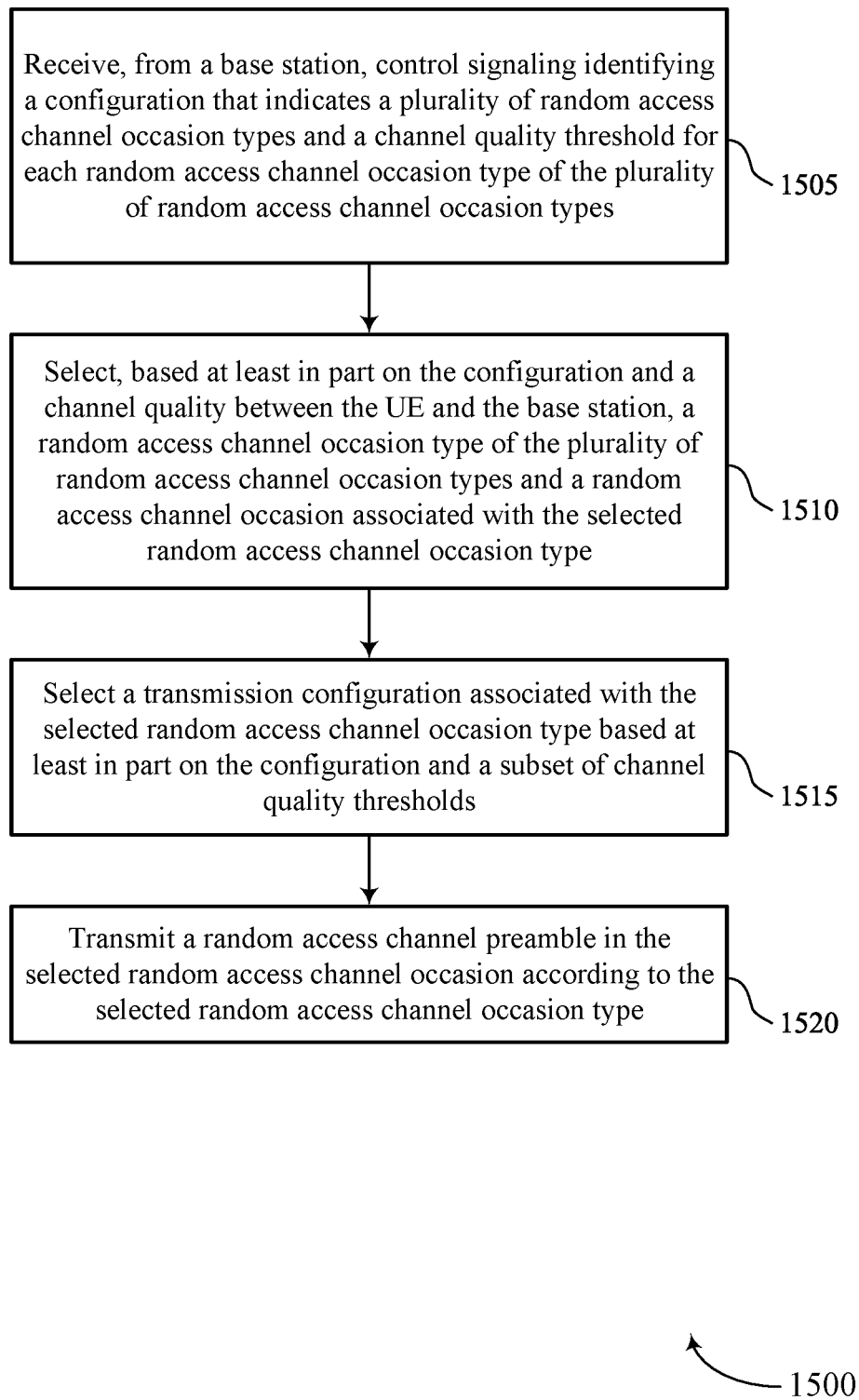

FIG. 15 shows a flowchart illustrating a method 1500 that supports techniques for selecting a random access channel occasion in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling identifying a configuration that indicates a set of multiple random access channel occasion types and a channel quality threshold for each random access channel occasion type of the set of multiple random access channel occasion types. The operations of 1505 may be performed in accordance with examples as disclosed herein. In some examples, aspects of the operations of 1505 may be performed by an occasion configuration component 825 as described with reference to FIG. 8.

At 1510, the method may include selecting, based on the configuration and a channel quality between the UE and the base station, a random access channel occasion type of the set of multiple random access channel occasion types and a random access channel occasion associated with the selected random access channel occasion type. The operations of 1510 may be performed in accordance with examples as disclosed herein. In some examples, aspects of the operations of 1510 may be performed by an occasion selection manager 830 as described with reference to FIG. 8.

At 1515, the method may include selecting a transmission configuration associated with the selected random access channel occasion type based on the configuration and a subset of channel quality thresholds. The operations of 1515 may be performed in accordance with examples as disclosed herein. In some examples, aspects of the operations of 1515 may be performed by an occasion selection manager 830 as described with reference to FIG. 8.

At 1520, the method may include transmitting a random access channel preamble in the selected random access channel occasion according to the selected random access channel occasion type. The operations of 1520 may be performed in accordance with examples as disclosed herein. In some examples, aspects of the operations of 1520 may be performed by a RACH preamble manager 835 as described with reference to FIG. 8.

Figure 16:
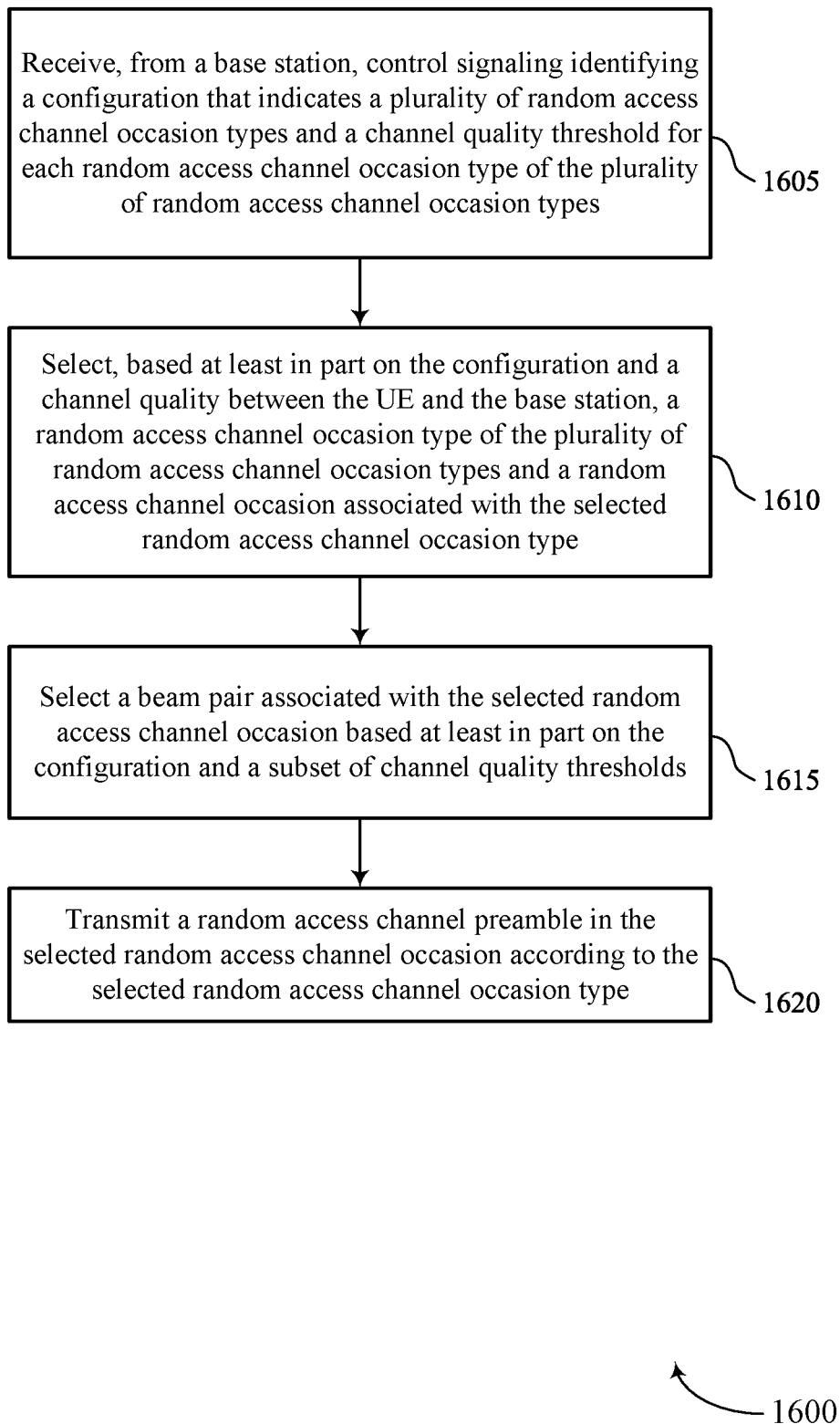

FIG. 16 shows a flowchart illustrating a method 1600 that supports techniques for selecting a random access channel occasion in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling identifying a configuration that indicates a set of multiple random access channel occasion types and a channel quality threshold for each random access channel occasion type of the set of multiple random access channel occasion types. The operations of 1605 may be performed in accordance with examples as disclosed herein. In some examples, aspects of the operations of 1605 may be performed by an occasion configuration component 825 as described with reference to FIG. 8.

At 1610, the method may include selecting, based on the configuration and a channel quality between the UE and the base station, a random access channel occasion type of the set of multiple random access channel occasion types and a random access channel occasion associated with the selected random access channel occasion type. The operations of 1610 may be performed in accordance with examples as disclosed herein. In some examples, aspects of the operations of 1610 may be performed by an occasion selection manager 830 as described with reference to FIG. 8.

At 1615, the method may include selecting a beam pair associated with the selected random access channel occasion based on the configuration and a subset of channel quality thresholds. The operations of 1615 may be performed in accordance with examples as disclosed herein. In some examples, aspects of the operations of 1615 may be performed by an occasion selection manager 830 as described with reference to FIG. 8.

At 1620, the method may include transmitting a random access channel preamble in the selected random access channel occasion according to the selected random access channel occasion type. The operations of 1620 may be performed in accordance with examples as disclosed herein. In some examples, aspects of the operations of 1620 may be performed by a RACH preamble manager 835 as described with reference to FIG. 8.

At 1625, the method may include the configuration further indicating one or more beam pairs for one or more random access channel occasions, the one or more random access channel occasions including the selected random access channel occasion. The operations of 1625 may be performed in accordance with examples as disclosed herein. In some examples, aspects of the operations of 1625 may be performed by an occasion configuration component 825 as described with reference to FIG. 8.

At 1630, the method may include the one or more beam pairs being associated with a subset of channel quality thresholds. The operations of 1630 may be performed in accordance with examples as disclosed herein. In some examples, aspects of the operations of 1630 may be performed by an occasion configuration component 825 as described with reference to FIG. 8.

Figure 17:
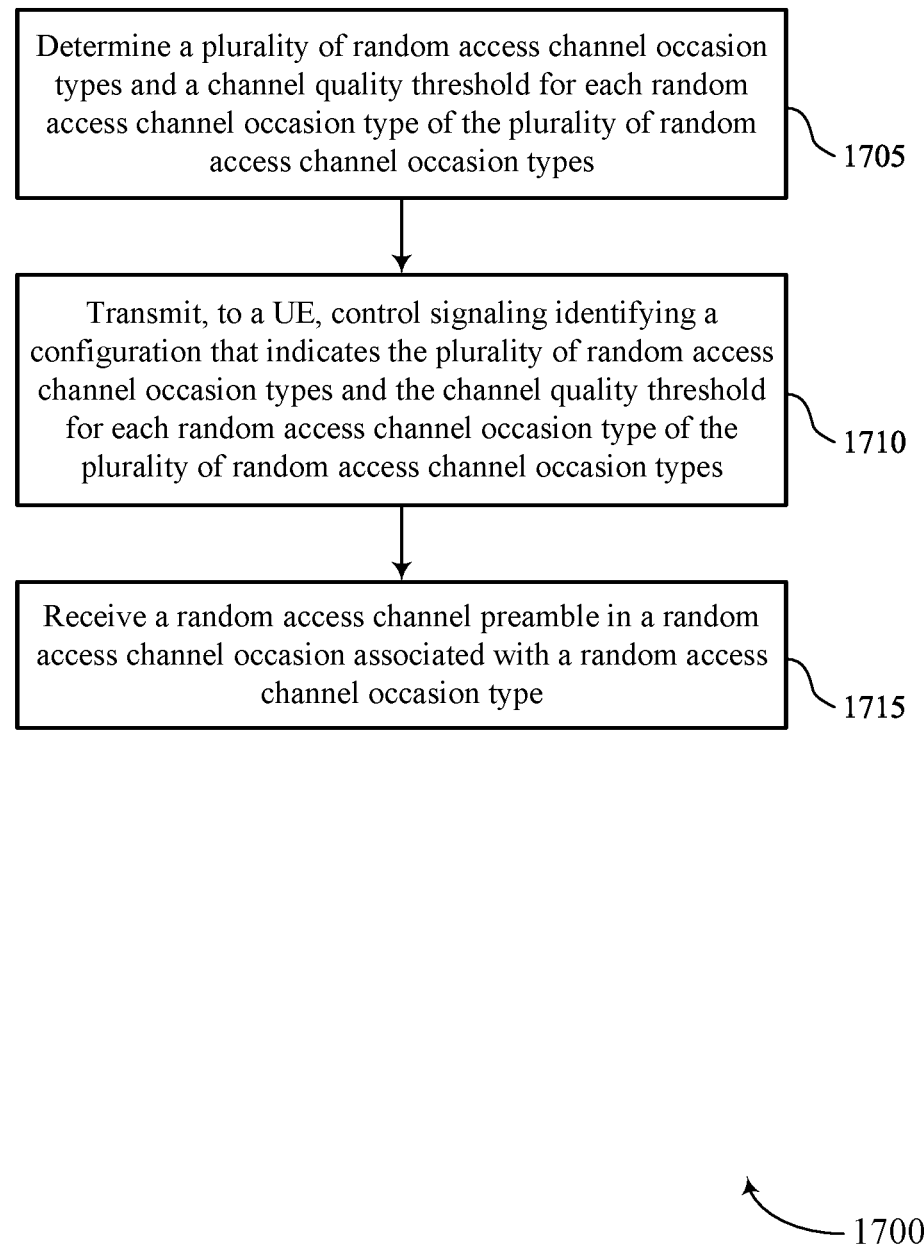

FIG. 17 shows a flowchart illustrating a method 1700 that supports techniques for selecting a random access channel occasion in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include determining a set of multiple random access channel occasion types and a channel quality threshold for each random access channel occasion type of the set of multiple random access channel occasion types. The operations of 1705 may be performed in accordance with examples as disclosed herein. In some examples, aspects of the operations of 1705 may be performed by an occasion manager 1225 as described with reference to FIG. 12.

At 1710, the method may include transmitting, to a UE, control signaling identifying a configuration that indicates the set of multiple random access channel occasion types and the channel quality threshold for each random access channel occasion type of the set of multiple random access channel occasion types. The operations of 1710 may be performed in accordance with examples as disclosed herein. In some examples, aspects of the operations of 1710 may be performed by an occasion configuration manager 1230 as described with reference to FIG. 12.

At 1715, the method may include receiving a random access channel preamble in a random access channel occasion associated with a random access channel occasion type. The operations of 1715 may be performed in accordance with examples as disclosed herein. In some examples, aspects of the operations of 1715 may be performed by a RACH preamble component 1235 as described with reference to FIG. 12.

Figure 18:
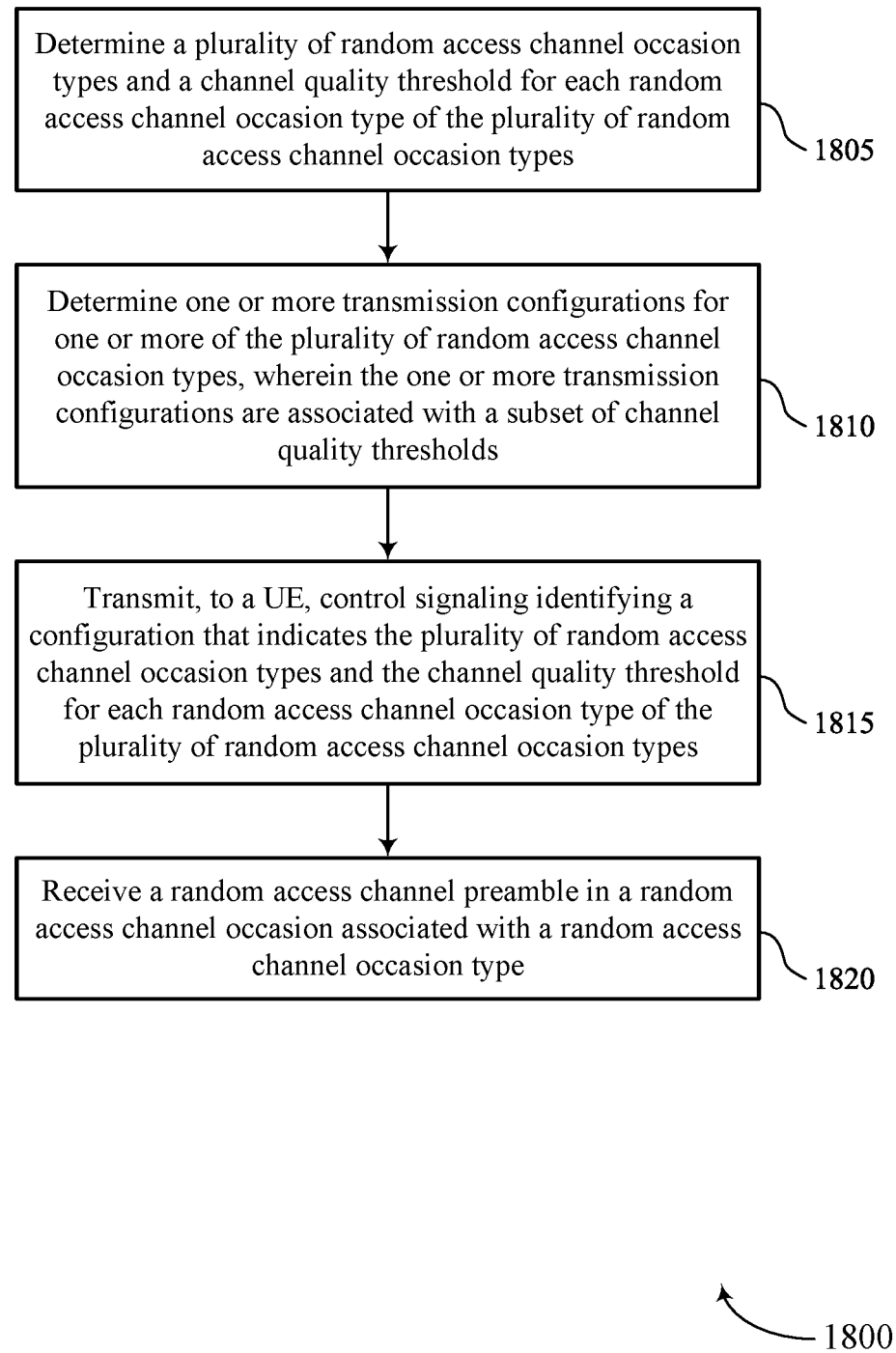

FIG. 18 shows a flowchart illustrating a method 1800 that supports techniques for selecting a random access channel occasion in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include determining a set of multiple random access channel occasion types and a channel quality threshold for each random access channel occasion type of the set of multiple random access channel occasion types. The operations of 1805 may be performed in accordance with examples as disclosed herein. In some examples, aspects of the operations of 1805 may be performed by an occasion manager 1225 as described with reference to FIG. 12.

At 1810, the method may include determining one or more transmission configurations for one or more of the set of multiple random access channel occasion types, where the one or more transmission configurations are associated with a subset of channel quality thresholds. The operations of 1810 may be performed in accordance with examples as disclosed herein. In some examples, aspects of the operations of 1810 may be performed by an occasion configuration manager 1230 as described with reference to FIG. 12.

At 1815, the method may include transmitting, to a UE, control signaling identifying a configuration that indicates the set of multiple random access channel occasion types and the channel quality threshold for each random access channel occasion type of the set of multiple random access channel occasion types. The operations of 1815 may be performed in accordance with examples as disclosed herein. In some examples, aspects of the operations of 1815 may be performed by an occasion configuration manager 1230 as described with reference to FIG. 12.

At 1820, the method may include receiving a random access channel preamble in a random access channel occasion associated with a random access channel occasion type. The operations of 1820 may be performed in accordance with examples as disclosed herein. In some examples, aspects of the operations of 1820 may be performed by a RACH preamble component 1235 as described with reference to FIG. 12.

Figure 19:
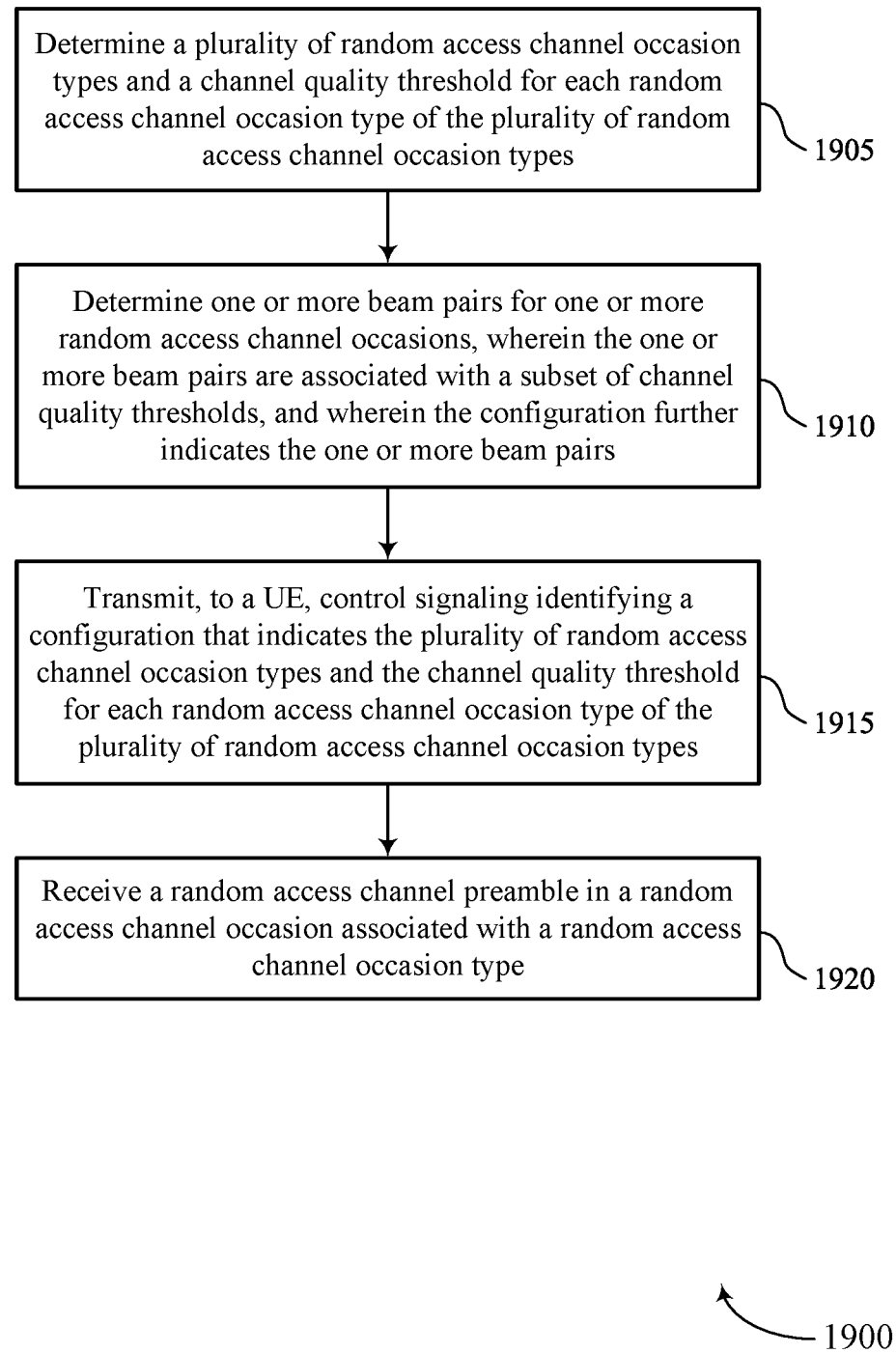

FIG. 19 shows a flowchart illustrating a method 1900 that supports techniques for selecting a random access channel occasion in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include determining a set of multiple random access channel occasion types and a channel quality threshold for each random access channel occasion type of the set of multiple random access channel occasion types. The operations of 1905 may be performed in accordance with examples as disclosed herein. In some examples, aspects of the operations of 1905 may be performed by an occasion manager 1225 as described with reference to FIG. 12.

At 1910, the method may include determining one or more beam pairs for one or more random access channel occasions, where the one or more beam pairs are associated with a subset of channel quality thresholds, and where the configuration further indicates the one or more beam pairs. The operations of 1910 may be performed in accordance with examples as disclosed herein. In some examples, aspects of the operations of 1910 may be performed by an occasion configuration manager 1230 as described with reference to FIG. 12.

At 1915, the method may include transmitting, to a UE, control signaling identifying a configuration that indicates the set of multiple random access channel occasion types and the channel quality threshold for each random access channel occasion type of the set of multiple random access channel occasion types. The operations of 1915 may be performed in accordance with examples as disclosed herein. In some examples, aspects of the operations of 1915 may be performed by an occasion configuration manager 1230 as described with reference to FIG. 12.

At 1920, the method may include receiving a random access channel preamble in a random access channel occasion associated with a random access channel occasion type. The operations of 1920 may be performed in accordance with examples as disclosed herein. In some examples, aspects of the operations of 1920 may be performed by a RACH preamble component 1235 as described with reference to FIG. 12.

The following provides an overview of aspects of the present disclosure:

Aspect 1: A method for wireless communications at a UE, comprising: receiving, from a base station, control signaling identifying a configuration that indicates a plurality of random access channel occasion types and a channel quality threshold for each random access channel occasion type of the plurality of random access channel occasion types; selecting, based at least in part on the configuration and a channel quality between the UE and the base station, a random access channel occasion type of the plurality of random access channel occasion types and a random access channel occasion associated with the selected random access channel occasion type; and transmitting a random access channel preamble in the selected random access channel occasion according to the selected random access channel occasion type.

Aspect 2: The method of aspect 1, wherein the configuration further indicates one or more transmission configurations for one or more of the plurality of random access channel occasion types; and the one or more transmission configurations are associated with a subset of channel quality thresholds.

Aspect 3: The method of aspect 2, further comprising: selecting a transmission configuration associated with the selected random access channel occasion type based at least in part on the configuration and the subset of channel quality thresholds.

Aspect 4: The method of any of aspects 1 through 3, wherein the configuration further indicates one or more beam pairs for one or more random access channel occasions, the one or more random access channel occasions comprising the selected random access channel occasion; and the one or more beam pairs are associated with a subset of channel quality thresholds.

Aspect 5: The method of aspect 4, further comprising: selecting a beam pair associated with the selected random access channel occasion based at least in part on the configuration and the subset of channel quality thresholds.

Aspect 6: The method of any of aspects 1 through 5, wherein the selected random access channel occasion is non-overlapping in a time domain with time resources of a downlink transmission.

Aspect 7: The method of any of aspects 1 through 6, wherein the selected random access channel occasion is overlapping in a time domain with time resources of a downlink transmission and non-overlapping in a frequency domain with frequency resources of the downlink transmission.

Aspect 8: The method of aspect 7, wherein the selected random access channel occasion is separated, in a frequency domain, from frequency resources of the downlink transmission by a guard band.

Aspect 9: The method of aspect 8, wherein the configuration further indicates a characteristic of the guard band based at least in part on the channel quality and the one or more channel quality thresholds.

Aspect 10: The method of any of aspects 1 through 9, wherein the selected random access channel occasion is overlapping in a time domain with time resources of a downlink transmission, overlapping in a frequency domain with frequency resources of the downlink transmission, and non-overlapping in a spatial domain with spatial resources of the downlink transmission.

Aspect 11: The method of any of aspects 1 through 10, further comprising: receiving second control signaling identifying an updated configuration, wherein selecting the random access channel occasion type and the random access channel occasion is based at least in part on the updated configuration, and wherein the one or more channel quality thresholds are determined based at least in part on the channel quality.

Aspect 12: The method of any of aspects 1 through 11, wherein the one or more channel quality thresholds are indicated by one or more radio resource control parameters in the received control signaling.

Aspect 13: The method of any of aspects 1 through 12, wherein selecting the random access channel occasion type comprises: comparing the channel quality with the channel quality threshold for each random access channel occasion type.

Aspect 14: The method of any of aspects 1 through 13, wherein the plurality of random access channel occasion types comprise a time division multiplexing type, a frequency division multiplexing type, a spatial division multiplexing type, or a combination thereof.

Aspect 15: The method of any of aspects 1 through 14, wherein each channel quality threshold comprises a synchronization signal block threshold or a channel state information reference signal threshold, or both.

Aspect 16: A method for wireless communications at a base station, comprising: determining a plurality of random access channel occasion types and a channel quality threshold for each random access channel occasion type of the plurality of random access channel occasion types; transmitting, to a UE, control signaling identifying a configuration that indicates the plurality of random access channel occasion types and the channel quality threshold for each random access channel occasion type of the plurality of random access channel occasion types; and receiving a random access channel preamble in a random access channel occasion associated with a random access channel occasion type.

Aspect 17: The method of aspect 16, further comprising: determining one or more transmission configurations for one or more of the plurality of random access channel occasion types, wherein the one or more transmission configurations are associated with a subset of channel quality thresholds.

Aspect 18: The method of aspect 17, wherein the configuration further indicates the one or more transmission configurations.

Aspect 19: The method of any of aspects 16 through 18, further comprising: determining one or more beam pairs for one or more random access channel occasions, wherein the one or more beam pairs are associated with a subset of channel quality thresholds, and wherein the configuration further indicates the one or more beam pairs.

Aspect 20: The method of any of aspects 16 through 19, wherein the random access channel occasion is non-overlapping in a time domain with time resources of a downlink transmission.

Aspect 21: The method of any of aspects 16 through 20, wherein the random access channel occasion is overlapping in a time domain with time resources of a downlink transmission and non-overlapping in a frequency domain with frequency resources of the downlink transmission.

Aspect 22: The method of aspect 21, wherein the random access channel occasion is separated, in a frequency domain, from frequency resources of the downlink transmission by a guard band.

Aspect 23: The method of aspect 22, wherein the configuration further indicates a characteristic of the guard band based at least in part on a channel quality and the channel quality thresholds.

Aspect 24: The method of any of aspects 16 through 23, wherein the random access channel occasion is overlapping in a time domain with time resources of a downlink transmission, overlapping in a frequency domain with frequency resources of the downlink transmission, and non-overlapping in a spatial domain with spatial resources of the downlink transmission.

Aspect 25: The method of any of aspects 16 through 24, further comprising: transmitting second control signaling identifying an updated configuration, wherein the channel quality thresholds are determined based at least in part on a channel quality.

Aspect 26: The method of any of aspects 16 through 25, wherein the channel quality thresholds are indicated by one or more radio resource control parameters in the transmitted control signaling.

Aspect 27: The method of any of aspects 16 through 26, wherein the plurality of random access channel occasion types comprise a time division multiplexing type, a frequency division multiplexing type, a spatial division multiplexing type, or a combination thereof.

Aspect 28: The method of any of aspects 16 through 27, wherein each channel quality threshold comprises a synchronization signal block threshold or a channel state information reference signal threshold, or both.

Aspect 29: An apparatus for wireless communications at a UE, comprising a processor; memory coupled with the processor; and instructions stored in the memory and executable by the processor to cause the apparatus to perform a method of any of aspects 1 through 15.

Aspect 30: An apparatus for wireless communications at a UE, comprising at least one means for performing a method of any of aspects 1 through 15.

Aspect 31: A non-transitory computer-readable medium storing code for wireless communications at a UE, the code comprising instructions executable by a processor to perform a method of any of aspects 1 through 15.

Aspect 32: An apparatus for wireless communications at a base station, comprising a processor; memory coupled with the processor; and instructions stored in the memory and executable by the processor to cause the apparatus to perform a method of any of aspects 16 through 28.

Aspect 33: An apparatus for wireless communications at a base station, comprising at least one means for performing a method of any of aspects 16 through 28.

Aspect 34: A non-transitory computer-readable medium storing code for wireless communications at a base station, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network entity, control signaling identifying a configuration that indicates a plurality of random access channel occasion types and a channel quality threshold for each random access channel occasion type of the plurality of random access channel occasion types, the plurality of random access channel occasion types comprising a time division multiplexing type, a frequency division multiplexing type, a spatial division multiplexing type, or a combination thereof;
   selecting, based at least in part on the configuration and a channel quality between the UE and the network entity, a random access channel occasion type of the plurality of random access channel occasion types and a random access channel occasion associated with the selected random access channel occasion type; and
   transmitting a random access channel preamble in the selected random access channel occasion type based at least in part on a multiplexing scheme comprising the selected random access channel occasion type.

2. The method of claim 1, wherein:
   the configuration further indicates one or more transmission configurations for one or more of the plurality of random access channel occasion types; and
   the one or more transmission configurations are associated with a subset of channel quality thresholds.

3. The method of claim 2, further comprising:
   selecting a transmission configuration associated with the selected random access channel occasion type based at least in part on the configuration and the subset of channel quality thresholds.

4. The method of claim 1, wherein:
   the configuration further indicates one or more beam pairs for one or more random access channel occasions, the one or more random access channel occasions comprising the selected random access channel occasion; and
   the one or more beam pairs are associated with a subset of channel quality thresholds.

5. The method of claim 4, further comprising:
   selecting a beam pair associated with the selected random access channel occasion based at least in part on the configuration and the subset of channel quality thresholds.

6. The method of claim 1, wherein the selected random access channel occasion is non-overlapping in a time domain with time resources of a downlink transmission.

7. The method of claim 1, wherein the selected random access channel occasion is overlapping in a time domain with time resources of a downlink transmission and non-overlapping in a frequency domain with frequency resources of the downlink transmission.

8. The method of claim 7, wherein the selected random access channel occasion is separated, in the frequency domain, from the frequency resources of the downlink transmission by a guard band.

9. The method of claim 8, wherein the configuration further indicates a characteristic of the guard band based at least in part on the channel quality and the channel quality threshold for each random access channel occasion type.

10. The method of claim 1, wherein the selected random access channel occasion is overlapping in a time domain with time resources of a downlink transmission, overlapping in a frequency domain with frequency resources of the downlink transmission, and non-overlapping in a spatial domain with spatial resources of the downlink transmission.

11. The method of claim 1, further comprising:
receiving second control signaling identifying an updated configuration, wherein selecting the random access channel occasion type and the random access channel occasion is based at least in part on the updated configuration, and wherein one or more channel quality thresholds are determined based at least in part on the channel quality.

12. The method of claim 1, wherein one or more channel quality thresholds are indicated by one or more radio resource control parameters in the received control signaling.

13. The method of claim 1, wherein selecting the random access channel occasion type comprises:
comparing the channel quality with the channel quality threshold for each random access channel occasion type.

14. The method of claim 1, wherein the plurality of random access channel occasion types comprise the time division multiplexing type, the frequency division multiplexing type, the spatial division multiplexing type, or a combination thereof.

15. The method of claim 1, wherein each channel quality threshold comprises a synchronization signal block threshold or a channel state information reference signal threshold, or both.

16. A method for wireless communications at a network entity, comprising:
determining a plurality of random access channel occasion types and a channel quality threshold for each random access channel occasion type of the plurality of random access channel occasion type, the plurality of random access channel occasion types comprising a time division multiplexing type, a frequency division multiplexing type, a spatial division multiplexing type, or a combination thereof;
transmitting, to a user equipment (UE), control signaling identifying a configuration that indicates the plurality of random access channel occasion types and the channel quality threshold for each random access channel occasion type of the plurality of random access channel occasion types; and
receiving a random access channel preamble in a random access channel occasion type based at least in part on a multiplexing scheme comprising a random access channel occasion type of the plurality of random access channel occasion types.

17. The method of claim 16, further comprising:
determining one or more transmission configurations for one or more of the plurality of random access channel occasion types, wherein the one or more transmission configurations are associated with a subset of channel quality thresholds.

18. The method of claim 17, wherein the configuration further indicates the one or more transmission configurations.

19. The method of claim 16, further comprising:
determining one or more beam pairs for one or more random access channel occasions, wherein the one or more beam pairs are associated with a subset of channel quality thresholds, and wherein the configuration further indicates the one or more beam pairs.

20. The method of claim 16, wherein the random access channel occasion is non-overlapping in a time domain with time resources of a downlink transmission.

21. The method of claim 16, wherein the random access channel occasion is overlapping in a time domain with time resources of a downlink transmission and non-overlapping in a frequency domain with frequency resources of the downlink transmission.

22. The method of claim 21, wherein the random access channel occasion is separated, in the frequency domain, from the frequency resources of the downlink transmission by a guard band.

23. The method of claim 22, wherein the configuration further indicates a characteristic of the guard band based at least in part on a channel quality and channel quality thresholds.

24. The method of claim 16, wherein the random access channel occasion is overlapping in a time domain with time resources of a downlink transmission, overlapping in a frequency domain with frequency resources of the downlink transmission, and non-overlapping in a spatial domain with spatial resources of the downlink transmission.

25. The method of claim 16, further comprising:
transmitting second control signaling identifying an updated configuration, wherein channel quality thresholds are determined based at least in part on a channel quality.

26. The method of claim 16, wherein channel quality thresholds are indicated by one or more radio resource control parameters in the transmitted control signaling.

27. The method of claim 16, wherein the plurality of random access channel occasion types comprise the time division multiplexing type, the frequency division multiplexing type, the spatial division multiplexing type, or a combination thereof.

28. The method of claim 16, wherein each channel quality threshold comprises a synchronization signal block threshold or a channel state information reference signal threshold, or both.

29. An apparatus for wireless communications at a user equipment (UE), comprising:
a processor;
memory coupled with the processor; and
instructions stored in the memory and executable by the processor to cause the apparatus to:
receive, from a network entity, control signaling identifying a configuration that indicates a plurality of random access channel occasion types and a channel quality threshold for each random access channel occasion type of the plurality of random access channel occasion types, the plurality of random access channel occasion types comprising a time division multiplexing type, a frequency division multiplexing type, a spatial division multiplexing type, or a combination thereof;
select, based at least in part on the configuration and a channel quality between the UE and the network entity, a random access channel occasion type of the plurality of random access channel occasion types and a random access channel occasion associated with the selected random access channel occasion type; and
transmit a random access channel preamble in the selected random access channel occasion type based at least in part on a multiplexing scheme comprising the selected random access channel occasion type.

30. An apparatus for wireless communications at a network entity, comprising:
- a processor;
- memory coupled with the processor; and
- instructions stored in the memory and executable by the processor to cause the apparatus to:
  - determine a plurality of random access channel occasion types and a channel quality threshold for each random access channel occasion type of the plurality of random access channel occasion types, the plurality of random access channel occasion types comprising a time division multiplexing type, a frequency division multiplexing type, a spatial division multiplexing type, or a combination thereof;
  - transmit, to a user equipment (UE), control signaling identifying a configuration that indicates the plurality of random access channel occasion types and the channel quality threshold for each random access channel occasion type of the plurality of random access channel occasion types; and
  - receive a random access channel preamble in a random access channel occasion type based at least in part on a multiplexing scheme comprising a random access channel occasion type of the plurality of random access channel occasion types.

* * * * *